(12) United States Patent
Shimokawa et al.

(10) Patent No.: US 9,065,728 B2
(45) Date of Patent: Jun. 23, 2015

(54) FAILURE ANALYSIS DEVICE, AND SYSTEM AND METHOD FOR SAME

(75) Inventors: Isao Shimokawa, Mitaka (JP); Toshiaki Tarui, Sagamihara (JP); Hiroki Miyamoto, Fujisawa (JP); Tomohiro Baba, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 140 days.

(21) Appl. No.: 13/819,563

(22) PCT Filed: Mar. 3, 2011

(86) PCT No.: PCT/JP2011/054886
§ 371 (c)(1),
(2), (4) Date: May 9, 2013

(87) PCT Pub. No.: WO2012/117549
PCT Pub. Date: Sep. 7, 2012

(65) Prior Publication Data
US 2013/0329571 A1 Dec. 12, 2013

(51) Int. Cl.
*H04L 12/24* (2006.01)
*H04L 12/26* (2006.01)
*H04L 12/703* (2013.01)

(52) U.S. Cl.
CPC ............... *H04L 41/06* (2013.01); *H04L 45/28* (2013.01); *H04L 41/142* (2013.01); *H04L 41/0631* (2013.01)

(58) Field of Classification Search
CPC .................. H04B 1/0466; H04L 29/06877
USPC ........................................................ 714/4.1
See application file for complete search history.

(56) References Cited

U.S. PATENT DOCUMENTS 7,639,714 B2 * 12/2009 Stolfo et al. ............... 370/474
7,694,338 B1 * 4/2010 Jafari et al. ................. 726/22
(Continued)

FOREIGN PATENT DOCUMENTS

JP  11-177549 A   7/1999
JP  2005-189163 A  7/2005
(Continued)

OTHER PUBLICATIONS

International Search Report on application PCT/JP2011/054886 mailed Mar. 29, 2011; 2 pages.

*Primary Examiner* — Noel Beharry
*Assistant Examiner* — Calvin Hsieh
(74) *Attorney, Agent, or Firm* — Foley & Lardner LLP

(57) ABSTRACT

Systems, methods and devices for failure analysis are provided. Using aggregation flow mining (AFM) or a similar method, an integrated mining of flow (IMF) acquires, from each router to be tested, information relating to each flow. The IMF, in relation to each of the routers, obtains distributions of statistical information such as throughput or difference for each flow; calculates, in relation to each of the distributions, a Mahalanobis distance in relation to the expected value of a reference distribution; and makes a comprehensive assessment of the distributions to perform a fault determination. When the fault determination is performed, a normal value of the distribution used for comparison is acquired from AFM and updated through feedback as needed. After the results of fault determination relating to other routers are assessed, the expected value of the standard deviation and the average value of the reference distribution used for comparison are updated.

10 Claims, 32 Drawing Sheets

(56) References Cited

U.S. PATENT DOCUMENTS

| | | |
|---|---|---|
| 8,533,819 B2 * | 9/2013 | Hoeflin et al. ................. 726/22 |
| 2005/0157327 A1 | 7/2005 | Shoji et al. |
| 2006/0230167 A1 | 10/2006 | Watanabe et al. |
| 2007/0061610 A1 * | 3/2007 | Nakamura ........................ 714/4 |
| 2007/0171085 A1 | 7/2007 | Imai et al. |
| 2007/0223481 A1 * | 9/2007 | Sivakumar et al. ........... 370/392 |
| 2010/0138919 A1 * | 6/2010 | Peng et al. ..................... 726/22 |

FOREIGN PATENT DOCUMENTS

| | | |
|---|---|---|
| JP | 2006-314077 A | 11/2006 |
| JP | 2007-201646 A | 8/2007 |
| JP | 2008-118242 A | 5/2008 |

* cited by examiner

FIG. 11

| | REFERENCE DISTRIBUTION | ROUTER A | | |
| --- | --- | --- | --- | --- |
| | | STATISTIC DISTRIBUTION OF ROUTER A | Flow1 | Flow2 |
| Source IP | | | 192.168.30.1 | 192.168.30.2 |
| Destination IP | | | 192.168.30.200 | 192.168.30.200 |
| Source Port | | | 1000 | 1200 |
| Destination Port | | | 2000 | 2200 |
| Average Packet Size [byte] | 300 | 325 | 300 | 350 |
| Average Packet Size Deviation | 300 | 25 | | |
| Throughput [Mbit/s] | 400 | 200 | 200 | 250 |
| Throughput Deviation | 300 | 25 | | |
| Drop Ratio | 0.1 | 0.015 | 0.01 | 0.02 |
| Drop Ration Deviation | 0.1 | 0.005 | | |

1101

1102 ANALYSIS PARAMETER

FIG. 12B

| DROP RATIO | EXPECTED VALUE OF STANDARD DEVIATION OF DROP RATIO | EXPECTED VALUE OF DROP RATIO | MAHALANOBIS DISTANCE OF DROP RATIO |
|---|---|---|---|
| 0.4 | 0.2 | 0.2 | 1 |
| 0.1 | 0.2 | 0.2 | 0.5 |
| 0.1 | 0.2 | 0.2 | 0.5 |
| 0.2 | 0.2 | 0.2 | 0 |
| 0.001 | 0.2 | 0.2 | 0.995 |
| 0.2 | 0.2 | 0.2 | 0 |
| 0.5 | 0.2 | 0.2 | 1.5 |
| 0.6 | 0.2 | 0.2 | 2 |
| 0.7 | 0.2 | 0.2 | 2.5 |
| AVERAGE | DEVIATION | | AVERAGE MAHALANOBIS DISTANCE |
| 0.311222222 | 0.232920481 | | 0.999444444 |

FIG. 13B

| THROUGHPUT [Mbt/s] | EXPECTED VALUE OF STANDARD DEVIATION OF THROUGHPUT | EXPECTED VALUE OF THROUGHPUT | MAHALANOBIS DISTANCE OF THROUGHPUT |
|---|---|---|---|
| 100 | 200 | 200 | 0.5 |
| 1500 | 200 | 200 | 6.5 |
| 1500 | 200 | 200 | 6.5 |
| 1500 | 200 | 200 | 6.5 |
| 400 | 200 | 200 | 1 |
| 30 | 200 | 200 | 0.85 |
| 50 | 200 | 200 | 0.75 |
| 100 | 200 | 200 | 0.5 |
| 100 | 200 | 200 | 0.5 |
| AVERAGE 586.6666667 | DEVIATION 653.6903786 | | AVERAGE MAHALANOBIS DISTANCE 2.622222222 |

1302

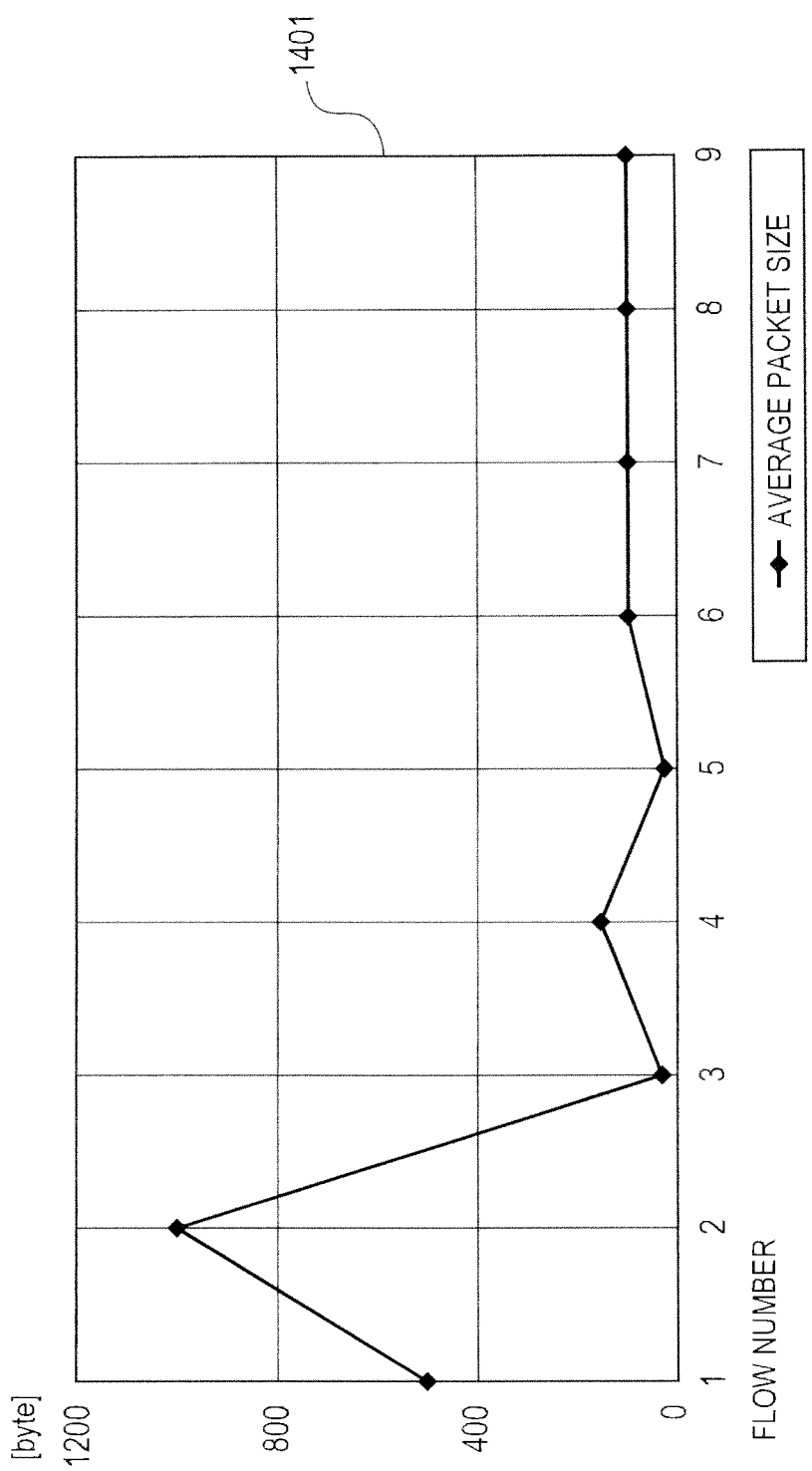

FIG. 14B

| AVERAGE PACKET SIZE | EXPECTED VALUE OF STANDARD DEVIATION OF AVERAGE PACKET SIZE | EXPECTED VALUE OF AVERAGE PACKET SIZE | MAHALANOBIS DISTANCE OF AVERAGE PACKET SIZE |
|---|---|---|---|
| 500 | 300 | 300 | 0.666666667 |
| 1000 | 300 | 300 | 2.333333333 |
| 30 | 300 | 300 | 0.9 |
| 150 | 300 | 300 | 0.5 |
| 20 | 300 | 300 | 0.933333333 |
| 100 | 300 | 300 | 0.666666667 |
| 100 | 300 | 300 | 0.666666667 |
| 100 | 300 | 300 | 0.666666667 |
| AVERAGE | DEVIATION | | AVERAGE MAHALANOBIS DISTANCE |
| 233.3333333 | 302.5447625 | | 0.888888889 |

FIG. 15B

| THREE-DIMENSIONAL MAHALANOBIS DISTANCE | EXPECTED VALUE OF STANDARD DEVIATION OF THREE-DIMENSIONAL MAHALANOBIS | EXPECTED VALUE OF THREE-DIMENSIONAL MAHALANOBIS | MAHALANOBIS DISTANCE |
|---|---|---|---|
| 1.301708279 | 1.72 | 0 | 0.756807139 |
| 6.924192693 | 1.72 | 0 | 4.025693426 |
| 6.581033354 | 1.72 | 0 | 3.826182182 |
| 6.519202405 | 1.72 | 0 | 3.790233957 |
| 1.691489317 | 1.72 | 0 | 0.983424022 |
| 1.080252028 | 1.72 | 0 | 0.628053505 |
| 1.804700652 | 1.72 | 0 | 1.049244565 |
| 2.166666667 | 1.72 | 0 | 1.259689922 |
| 2.635231383 | 1.72 | 0 | 1.532111269 |

1502

| STANDARD DEVIATION OF THREE-DIMENSIONAL MAHALANOBIS DISTANCE | AVERAGE OF THREE-DIMENSIONAL MAHALANOBIS DISTANCE |
|---|---|
| 1.365160462 | 1.983493332 |
| | 3.411608531 |
| | THRESHOLD VALUE |
| | 3.464101615 |

FIG. 16B

| DROP RATIO | EXPECTED VALUE OF STANDARD DEVIATION OF DROP RATIO | EXPECTED VALUE OF DROP RATIO | MAHALANOBIS DISTANCE OF DROP RATIO |
|---|---|---|---|
| 0.4 | 0.216460241 | 0.255611111 | 0.667045775 |
| 0.1 | 0.216460241 | 0.255611111 | 0.71889004 |
| 0.1 | 0.216460241 | 0.255611111 | 0.71889004 |
| 0.2 | 0.216460241 | 0.255611111 | 0.256911435 |
| 0.001 | 0.216460241 | 0.255611111 | 1.176248859 |
| 0.2 | 0.216460241 | 0.255611111 | 0.256911435 |
| 0.5 | 0.216460241 | 0.255611111 | 1.129024379 |
| 0.6 | 0.216460241 | 0.255611111 | 1.591002984 |
| 0.7 | 0.216460241 | 0.255611111 | 2.052981589 |
| AVERAGE | DEVIATION | | AVERAGE MAHALANOBIS DISTANCE |
| 0.311222222 | 0.232920481 | | 0.951989615 |

1602

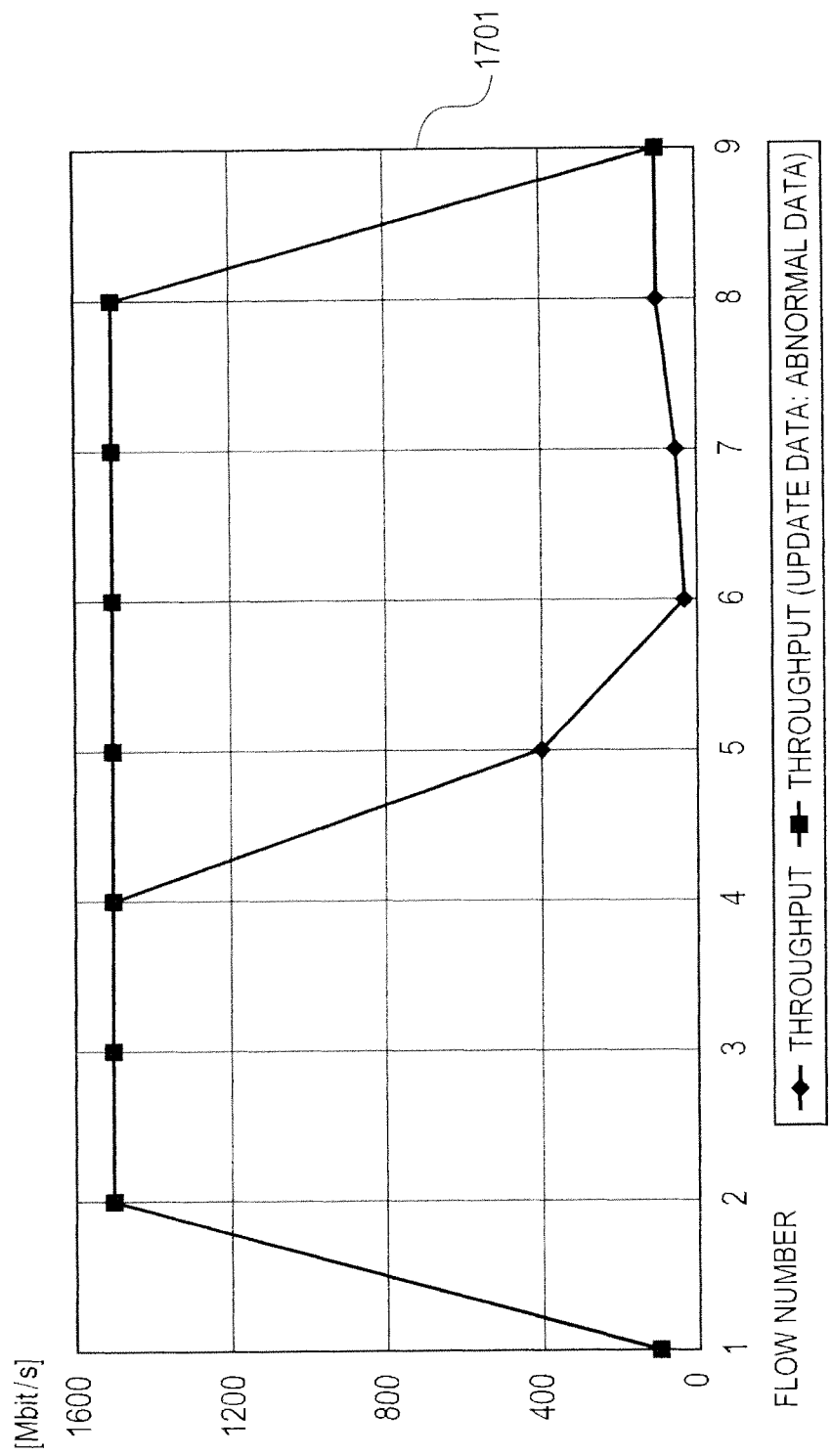

FIG. 17B

| THROUGHPUT [Mbit/s] | EXPECTED VALUE OF STANDARD DEVIATION OF THROUGHPUT | EXPECTED VALUE OF THROUGHPUT | MAHALANOBIS DISTANCE OF THROUGHPUT |
|---|---|---|---|
| 100 | 426.8451893 | 393.3333333 | 0.687212462 |
| 1500 | 426.8451893 | 393.3333333 | 2.592665197 |
| 1500 | 426.8451893 | 393.3333333 | 2.592665197 |
| 1500 | 426.8451893 | 393.3333333 | 2.592665197 |
| 400 | 426.8451893 | 393.3333333 | 0.015618465 |
| 30 | 426.8451893 | 393.3333333 | 0.851206345 |
| 50 | 426.8451893 | 393.3333333 | 0.80435095 |
| 100 | 426.8451893 | 393.3333333 | 0.687212462 |
| 100 | 426.8451893 | 393.3333333 | 0.687212462 |
| AVERAGE | DEVIATION | | AVERAGE MAHALANOBIS DISTANCE |
| 586.6666667 | 653.6903786 | | 1.278978748 |

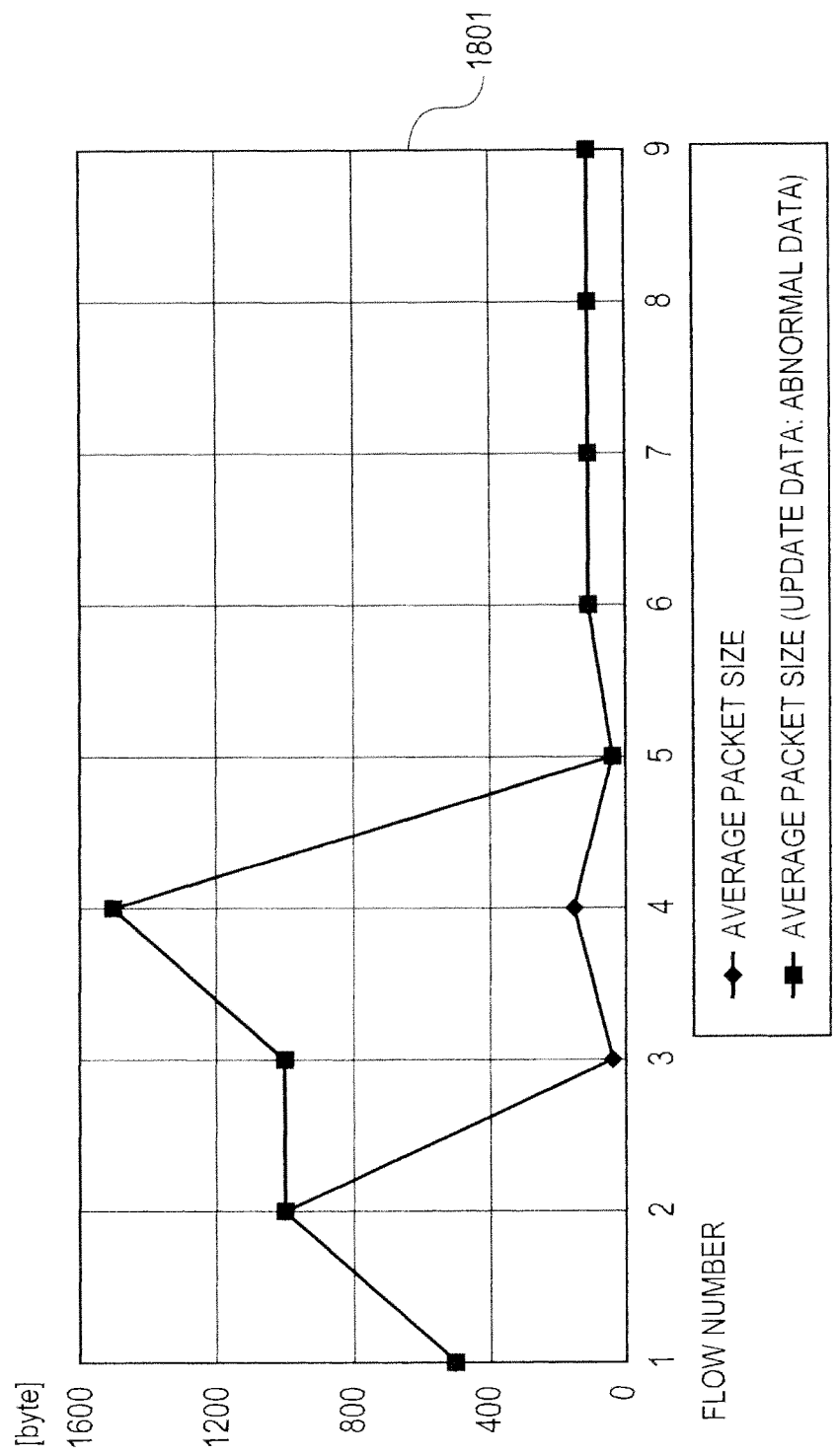

FIG. 18B

| AVERAGE PACKET SIZE | EXPECTED VALUE OF STANDARD DEVIATION OF AVERAGE PACKET SIZE | EXPECTED VALUE OF AVERAGE PACKET SIZE | MAHALANOBIS DISTANCE OF AVERAGE PACKET SIZE |
|---|---|---|---|
| 500 | 301.2723813 | 266.6666667 | 0.774492943 |
| 1000 | 301.2723813 | 266.6666667 | 2.434120679 |
| 30 | 301.2723813 | 266.6666667 | 0.785557128 |
| 150 | 301.2723813 | 266.6666667 | 0.387246472 |
| 20 | 301.2723813 | 266.6666667 | 0.818749683 |
| 100 | 301.2723813 | 266.6666667 | 0.553209245 |
| 100 | 301.2723813 | 266.6666667 | 0.553209245 |
| 100 | 301.2723813 | 266.6666667 | 0.553209245 |
| AVERAGE | DEVIATION | | AVERAGE MAHALANOBIS DISTANCE |
| 233.3333333 | 302.5447625 | | 0.823667099 |

FIG. 19B

| THREE-DIMENSIONAL MAHALANOBIS DISTANCE | EXPECTED VALUE OF STANDARD DEVIATION OF THREE-DIMENSIONAL MAHALANOBIS | EXPECTED VALUE OF THREE-DIMENSIONAL MAHALANOBIS | MAHALANOBIS DISTANCE |
|---|---|---|---|
| 1.23168598 | 1.72 | 0 | 0.7160965 |
| 3.628175739 | 1.72 | 0 | 2.109404499 |
| 2.802822812 | 1.72 | 0 | 1.629548146 |
| 2.63398484 | 1.72 | 0 | 1.531386535 |
| 1.433232835 | 1.72 | 0 | 0.833274904 |
| 1.047184891 | 1.72 | 0 | 0.608828425 |
| 1.492553841 | 1.72 | 0 | 0.867763861 |
| 1.819228389 | 1.72 | 0 | 1.057690924 |
| 2.234509978 | 1.72 | 0 | 1.299133708 |

1902

| STANDARD DEVIATION OF THREE-DIMENSIONAL MAHALANOBIS DISTANCE | AVERAGE OF THREE-DIMENSIONAL MAHALANOBIS DISTANCE |
|---|---|
| 0.468750383 | 1.183680834 |
| | 2.035931034 |
| | THRESHOLD VALUE |
| | 3.464101615 |

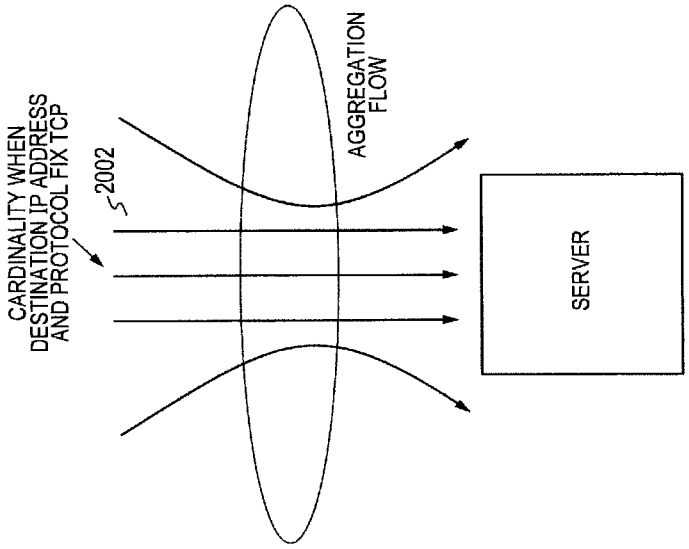
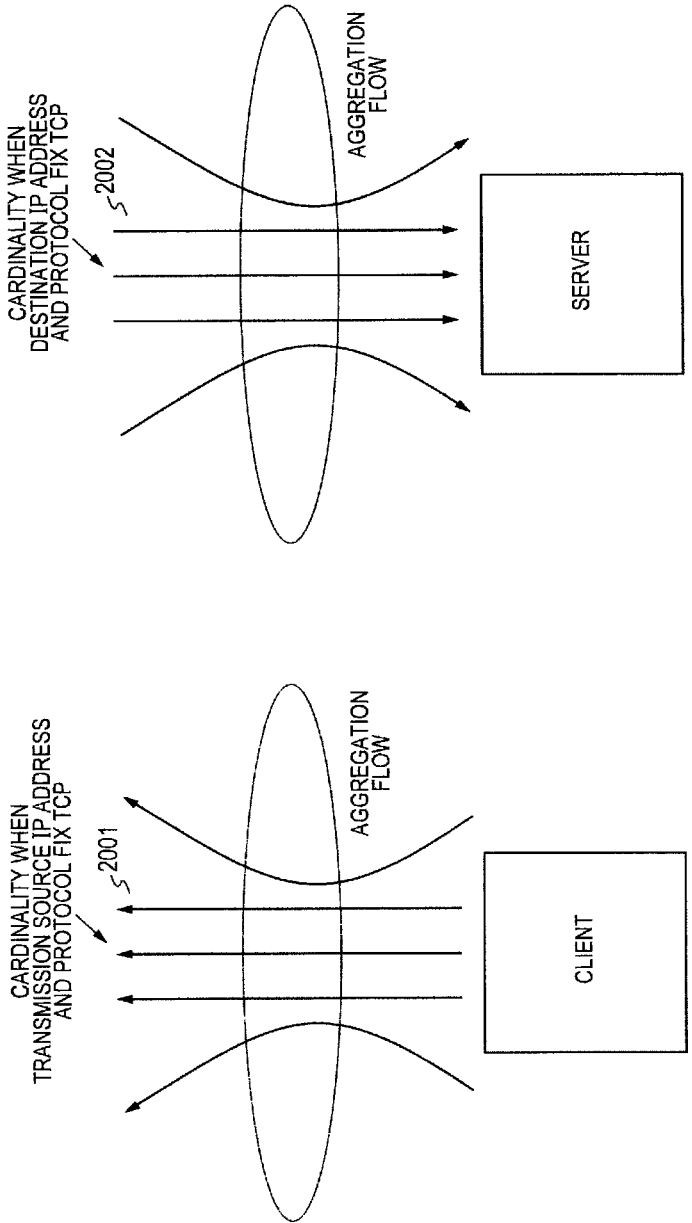

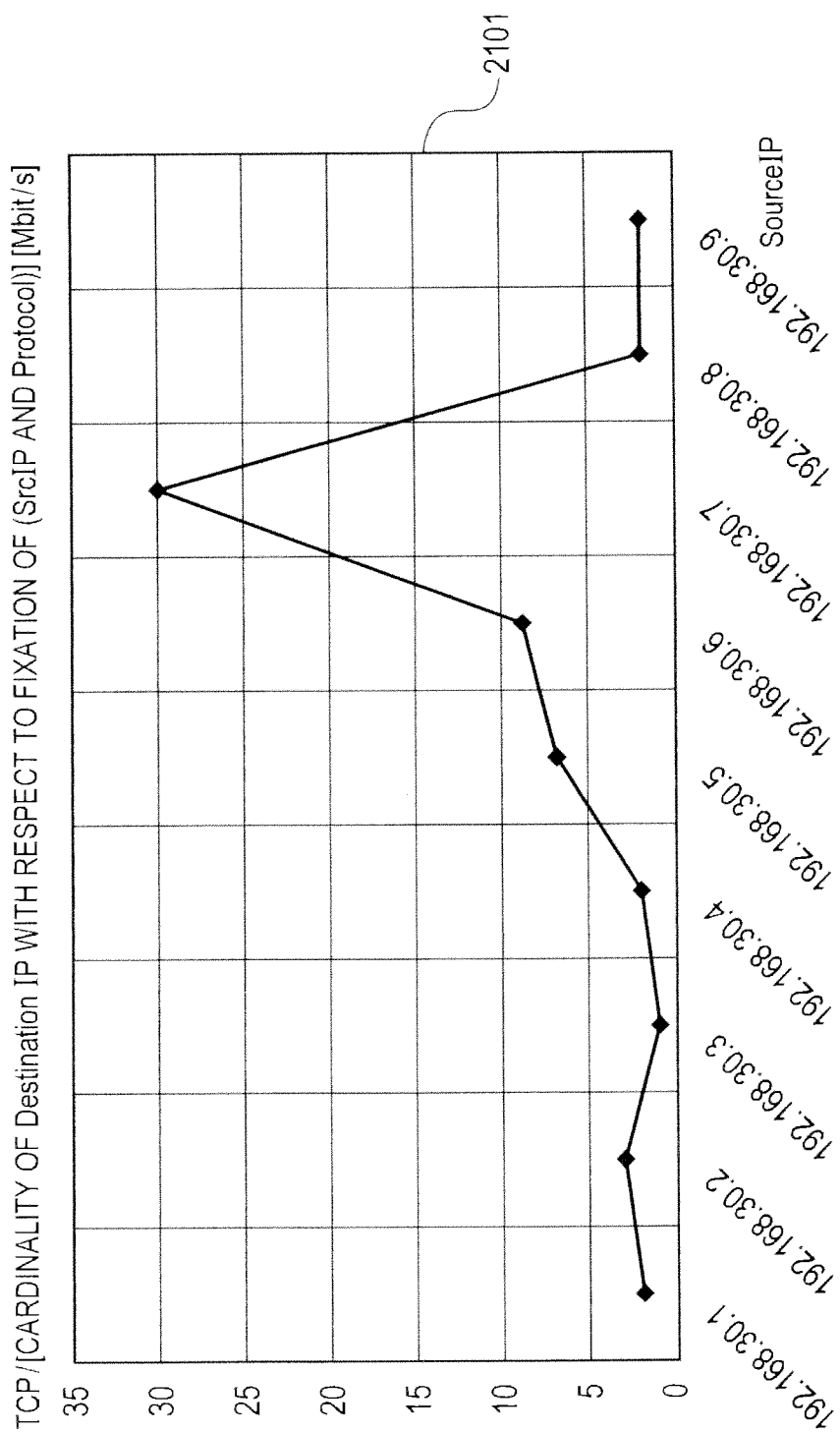

FIG. 21B

| SourceIP | THROUGHPUT [Mbit/s] | EXPECTED VALUE OF STANDARD DEVIATION OF THROUGHPUT | EXPECTED VALUE OF AVERAGE OF THROUGHPUT | MAHALANOBIS DISTANCE |
|---|---|---|---|---|
| 192.168.30.1 | 2 | 3 | 3 | 0.333333333 |
| 192.168.30.2 | 3 | 3 | 3 | 0 |
| 192.168.30.3 | 1 | 3 | 3 | 0.666666667 |
| 192.168.30.4 | 2 | 3 | 3 | 0.333333333 |
| 192.168.30.5 | 7 | 3 | 3 | 1.333333333 |
| 192.168.30.6 | 9 | 3 | 3 | 2 |
| 192.168.30.7 | 30 | 3 | 3 | 9 |
| 192.168.30.8 | 2 | 3 | 3 | 0.333333333 |
| 192.168.30.9 | 2 | 3 | 3 | 0.333333333 |
| | AVERAGE | STANDARD DEVIATION | | AVERAGE MAHALANOBIS DISTANCE |
| | 6.444444444 | 9.234596785 | | 1.592592593 |

2102

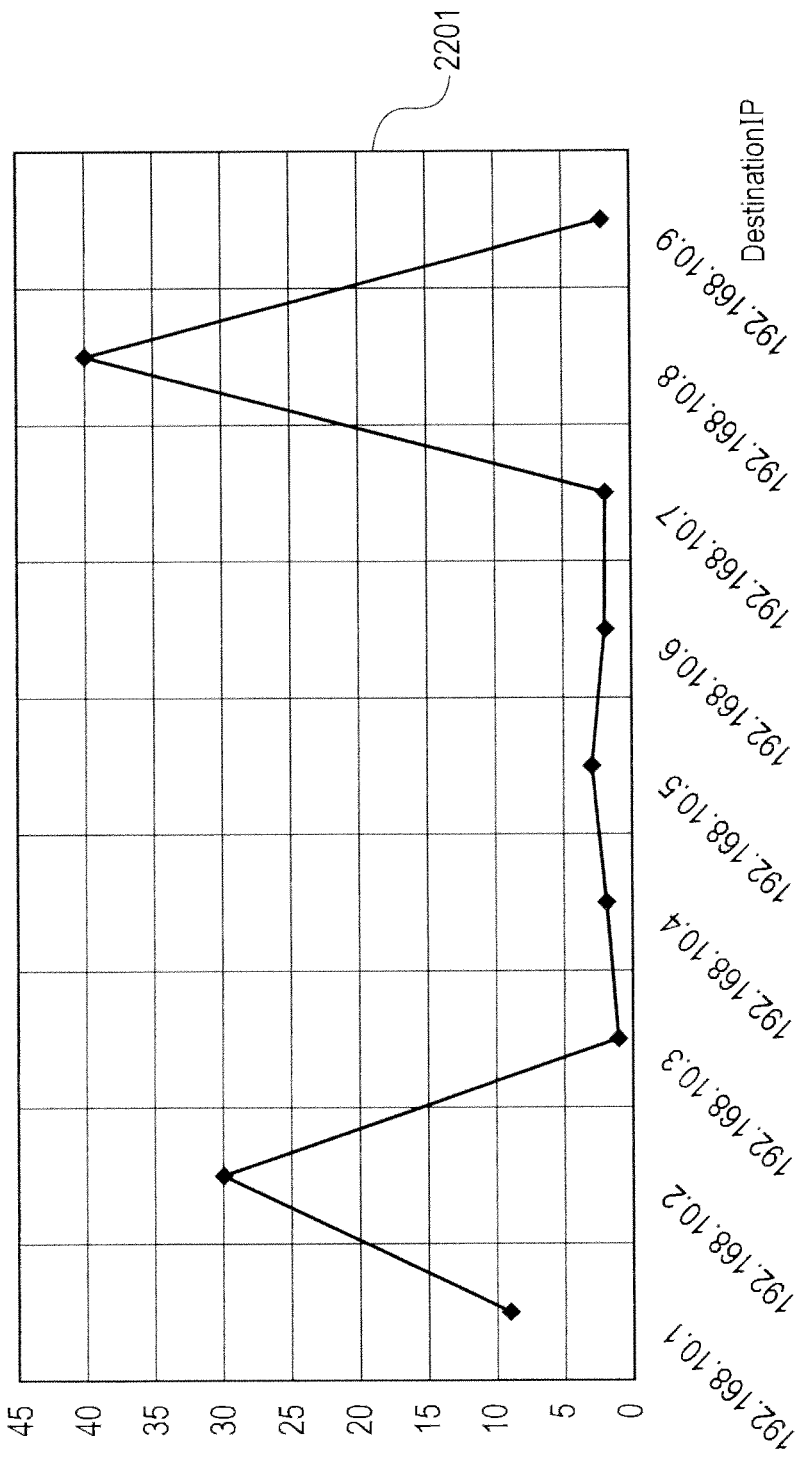

FIG. 22B

| DestinationIP | THROUGHPUT [Mbit/s] | EXPECTED VALUE OF STANDARD DEVIATION OF THROUGHPUT | EXPECTED VALUE OF AVERAGE OF THROUGHPUT | MAHALANOBIS DISTANCE |
|---|---|---|---|---|
| 192.168.10.1 | 9 | 3 | 3 | 2 |
| 192.168.10.2 | 30 | 3 | 3 | 9 |
| 192.168.10.3 | 1 | 3 | 3 | 0.666666667 |
| 192.168.10.4 | 2 | 3 | 3 | 0.333333333 |
| 192.168.10.5 | 3 | 3 | 3 | 0 |
| 192.168.10.6 | 2 | 3 | 3 | 0.333333333 |
| 192.168.10.7 | 2 | 3 | 3 | 0.333333333 |
| 192.168.10.8 | 40 | 3 | 3 | 12.333333333 |
| 192.168.10.9 | 2 | 3 | 3 | 0.333333333 |
| | AVERAGE | STANDARD DEVIATION | | AVERAGE MAHALANOBIS DISTANCE |
| | 10.11111111 | 14.52105751 | | 2.814814815 |

2202

FAILURE ANALYSIS DEVICE, AND SYSTEM AND METHOD FOR SAME

TECHNICAL FIELD

The present invention relates to a device that processes most wired nodes and analyzes the failure.

BACKGROUND ART

In recent years, in a large scaled distributed processing network system, the most important agenda is availability. If the distributed processing network system cannot be operated for 24 hours, 365 days without stopping, it is difficult to use the distributed processing network system for a core corporate. Specifically, to increase the operability of the distributed processing network system, it is necessary to improve reliability of the distributed processing network system and high speed responsiveness of information processing.

Currently, in order to improve the reliability of the communication, distributed processing is performed in an application and most of network systems have a redundant configuration. However, the expansion of services that use the distributed processing network system causes dramatic increase of traffics. Further, increase in power consumption in a data center and a network system, which perform the distributed processing and have a redundant configuration, is a concern for future use. Therefore, to focus on the low power consumption, it is required to efficiently reduce an enlarged network while establishing the reliability and optimally rearrange a virtual server or a virtual switch. As a result, a failure analysis technology is required. As a related art of the failure analysis method, Patent Literature 1 or Patent Literature 2 discloses a technology that detects the status change using a network tomography.

CITATION LIST

Patent Literature

Patent Literature 1: Japanese Patent Application Laid-Open Publication No. 2007-201646
Patent Literature 2: Japanese Patent Application Laid-Open Publication No. 2005-189163
Patent Literature 3: Japanese Patent Application Laid-Open Publication No. 2006-314077

SUMMARY OF INVENTION

Technical Problem

As one of control triggers that regularly and optimally rearrange the virtual server or the virtual switch in accordance with the control of the management server described above, a communication efficiency may be used. In a network having a bad communication efficiency, if the virtual server or the virtual switch is rearranged in such a network, there is a concern about increasing the power consumption mostly during the re-transmission. Therefore, it is required to quickly specify a bottleneck router and a bottleneck server in which failure occurs in the network system, notify the router or the server in which failure occurs to a management server that rearranges a virtual server or a virtual switch, and rearrange one virtual server or the virtual switch by the management server so as to avoid unnecessary power consumption.

The network tomography disclosed in Patent Literature 1 which relates to failure analysis transmits a probe packet from the outside and detects the status change using an analysis parameter such as delay of the probe packet. A technical problem in the network tomography is to estimate an event in the network topology by transmitting the probe packet from the outside of the network topology. However, since the analysis parameter which may obtain is small and the analysis parameter is not actual flow information, the failure or the event which may be analyzed is limited and the detection result may not be considered a failure.

For example, the status change is detected from delay data. If the status change of only the delay data is detected to transmit an alert, in the network system, as a cause of the increase of the delay, the delay may be caused by router queuing or the detection result may not be a failure. Further, since the status change is determined only by the fluctuation of the delay to transmit the alert, the alert may be transmitted even when no failure occurs, for example, rapid status change such as starting of an application transmission or stopping of an application transmission occurs. As described above, if the alert is transmitted to the management server only due to the rapid status change of the delay, the alert is transmitted even when no failure occurs. Therefore, the management server manages too much alerts and thus it is difficult for the management server to determine whether the system is abnormal. Further, it is difficult to specify a part in which the failure occurs so that it is difficult for the management server to rearrange the virtual switch or the virtual server using a result of the tomography.

Further, according to the abnormality determining device disclosed in Patent Literature 2, even though the complexity of the control when detecting the abnormality may be avoided, it is necessary to store data in a normal status in advance. Like the network system, in a system in which traffic situation is always changed and various failures occur, it is difficult to measure a parameter which may be determined to be normal in advance. As described above, if it is determined to be abnormal, it is difficult to define a reference value which is a comparison target.

An object of the present invention is to provide a failure analysis device, system, and method that specifically specify a failure location, reduce a false detection ratio for failure detection, avoid an excessive alert status, and precisely determine a trouble of the system.

Solution to Problem

To achieve the above object, the present invention provides a failure analysis device to which a plurality of routers on a network is connected, including: a receiving unit that receives information for every flow which flows on a traffic and acquired by each of the routers as a data group, a storing unit that stores the received data group, a failure analyzing unit that sets the stored data group for every router as at least one analysis parameter for every failure, calculates a Mahalanobis distance with respect to a reference distribution of the analysis parameter, performs abnormality determination using the Mahalanobis distance with respect to the reference distribution for every router, and updates an average value of the reference distribution and an expected value of a standard deviation which are used for abnormality determination of entire routers by the abnormality determination of each of the routers using a movement average.

Further, to achieve the above object, the present invention provides a network failure analysis system, including a plurality of routers to which a node is connected on a network and a failure analysis device which is connected to the plurality of routers. The failure analysis device includes a receiving unit that receives information for every flow which flows on a traffic and acquired by each of the routers as a data group, and a failure analyzing unit that sets the received data group for every router as at least one analysis parameter for every failure, calculates a Mahalanobis distance with respect to a reference distribution of the analysis parameter, performs abnormality determination using the Mahalanobis distance with respect to the reference distribution for every router.

In addition, to achieve the above object, the present invention provides a failure analysis method at a node which is connected to a plurality of routers on a network, which allows a node to perform the steps of receiving information for every flow which flows on a traffic and acquired by each of the routers as a data group, and setting the received data group for every router as at least one analysis parameter for every failure, calculating a Mahalanobis distance with respect to a reference distribution of the analysis parameter, and performing abnormality determination using the Mahalanobis distance with respect to the reference distribution for every router.

Advantages Effects of Invention

According to an aspect of the present invention, a data group which is transmitted with a large quantity is set as at least one analysis parameter, a Mahalanobis distance with respect to an expected value of a reference distribution is calculated with respect to a distribution of the analysis parameter, and the abnormality determination is comprehensively performed using the Mahalanobis distance with respect to the expected value of the reference distribution in the distribution of the analysis parameters so that she determination is appropriately performed.

Further, when the abnormality determination is performed, the expected value of the reference distribution which is a comparison target is determined from the result of the abnormality determination for every router which is managed by an information collection failure analysis device to be updated. Therefore, the status of entire system is determined to update the expected value of the reference distribution which is the comparison target so that the abnormality determination is more appropriately performed.

In addition, the abnormality determination is performed depending on whether a linear event is transited into a non-linear event so that there is no need to fix a reference value which is a comparison target.

BRIEF DESCRIPTION OF DRAWINGS

FIG. 11 is a view illustrating an example of a table managed by the IMF in each of the embodiments.

FIG. 12B is a view illustrating a table of data of a drop ratio in each of the embodiments.

FIG. 13B is a view illustrating data of a throughput in each of the embodiments.

FIG. 14A is a view illustrating a graph of data of an average packet size in each of the embodiments.

FIG. 14B is a view illustrating data of an average packet size in each of the embodiments.

FIG. 15B is a view illustrating data of a three dimensional Mahalanobis distance in each of the embodiments.

FIG. 16B is a view illustrating data of a drop ratio in each of the embodiments.

FIG. 17A is a view illustrating a graph of data of a throughput in each of the embodiments.

FIG. 17B is a view illustrating data of a throughput in each of the embodiments.

FIG. 18A is a view illustrating a graph of data of an average packet size in each of the embodiments.

FIG. 18B is a view illustrating data of an average packet size in each of the embodiments.

FIG. 19B is a view illustrating data of a three dimensional Mahalanobis distance in each of the embodiments.

FIG. 20A is a view explaining a cardinality which is a parameter of an AFM in a fifth embodiment.

FIG. 20B is a view explaining a cardinality which is a parameter of an AFM in the fifth embodiment.

FIG. 21A is a graph explaining a throughput for every Source IPAddress as a cardinality when (Source IPAddress, Protocol) is fixed in the fifth embodiment.

FIG. 21B is a view explaining a throughput for every Source IPAddress as a cardinality when (Source IPAddress, Protocol) is fixed in the fifth embodiment.

FIG. 22A is a graph explaining a throughput for every Destination IPAddress as a cardinality when (Source IPAddress, Protocol) is fixed in the fifth embodiment.

FIG. 22B is a view explaining a throughput for every destination IPAddress as a cardinality when (Source IPAddress, Protocol) is fixed in the fifth embodiment.

DESCRIPTION OF EMBODIMENTS

Hereinafter, specific embodiments of the present invention will be described with reference to the drawings.

First Embodiment

Figure 1:
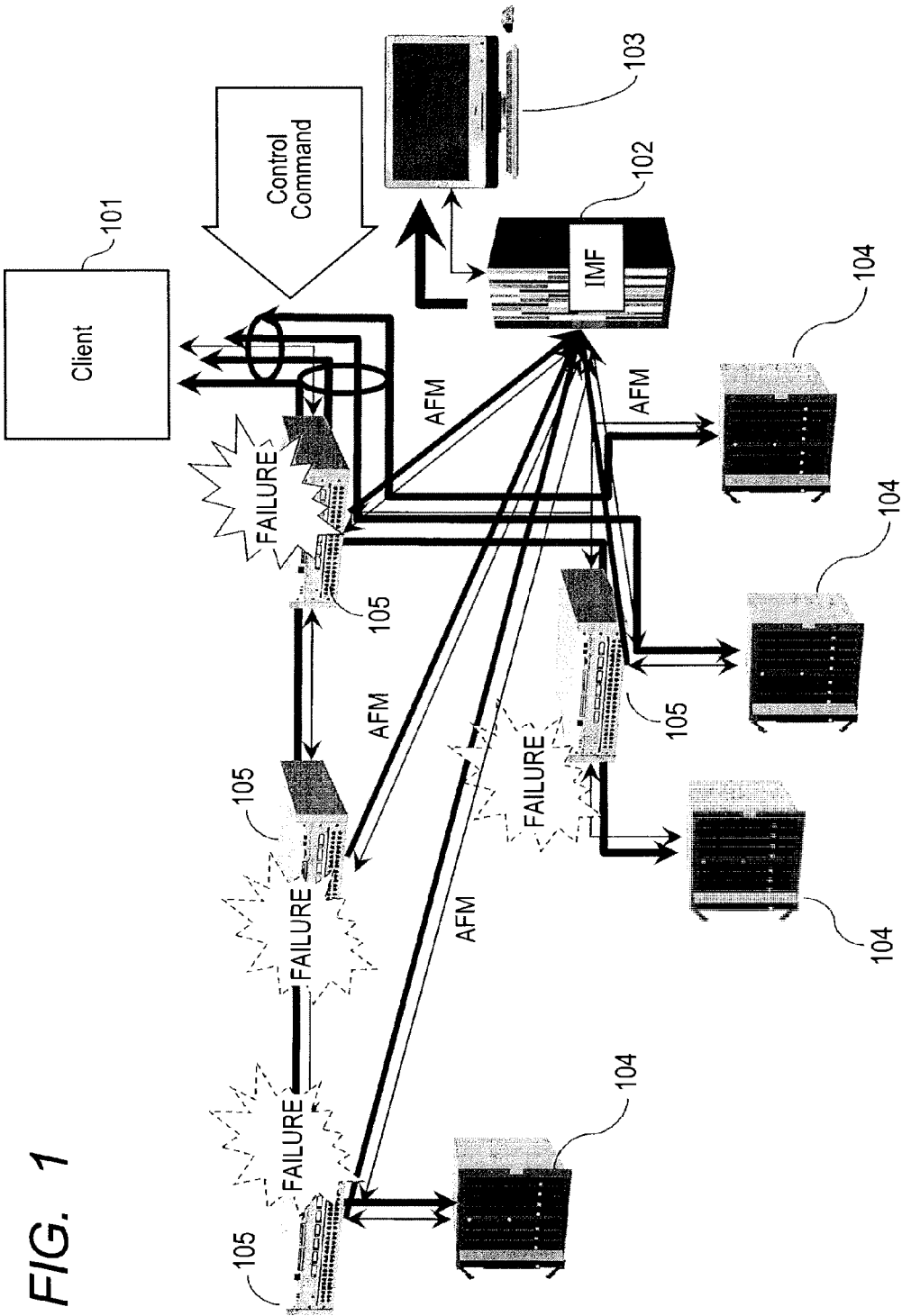
FIG. 1 is a schematic view of a system in a data center according to a first embodiment.

FIG. 1 illustrates a schematic configuration view of a management system that performs failure analysis in a data center of a first embodiment. In this specification, a failure analysis device that collects and analyzes information such as AFM (aggregation flow mining) transmitted from each of routers, which is an inspection target, is defined as IMF (integrated mining of flow), Further, an AFM technology is disclosed in Ikeda et al. "Large scale edge router and high speed traffic monitoring", IEICE technical report, vol. 109, No. 421, IA2009-90, pp 47-52, February 2010 or Japanese Patent Application Laid-Open Publication No. 2006-314077 by Watanabe et al.

A configuration of FIG. 1 indicates a system in which an integrated management server controls and manages a virtual server and a virtual switch in a data center. Reference numeral 101 denotes a client, reference numeral 102 denotes a failure analysis device (Integrated mining of flow: IMF), reference numeral 103 denotes the integrated management server, reference numeral 104 denotes a server, and reference numeral 105 denotes a router. In the management system, the management server 103 detects an abnormality of a device such as the router 105 or the server 104 and then controls the system. Here, to detect a status change of the router 105 or the server 104, it is necessary to acquire a statistic parameter for analyzing a status change of each of the routers 105 such as an amount of packets that pass through the router 105 in a specific time.

Further, in FIG. 1, among various wire connections between the client 101, the IMF 102, the integrated management server 103, the servers 104, and the routers 105 on the management system, a bidirectional thin solid line indicates a communication line therebetween and a thick solid line indicates flow of various information on the communication line. As apparent from FIG. 1, it is known that the AFM is sent from each of the routers 105 to the IMF 102 through the communication line. In addition, it is known that various control commands are sent to the client 101, the servers 104, and the routers 105. In this specification, each element on the network may be collectively called as a node excepting the router which serves as a communication control device. If there is no specific limitation, this is the same as in the system configuration views of FIG. 2 or subsequent drawings.

In the management system according to the embodiment, an AFM (aggregation flow mining) is exemplified as a unit that acquires a statistic parameter for analyzing the status change of each of the routers 105. As apparently seen from the above citations, in the AFM, a communication control device such as a router provides statistic information which allows an operator to quickly find an abnormal flow or a distinctive flow that hinders a normal operation of a network from a large amount of traffics. Further, conventional method of acquiring statistic information is an SNMP (simple network management protocol). However, since the SNMP uses an MIB (management information base), if the statistic information is transmitted to a manager, real-time statistic information cannot be transmitted to the manager because the information exchange between the SNMP and the MIB is performed at a low speed. In addition, the statistic information of the SNMP has lots of coarse information such as queue information of the router 105.

The AFM is different from the SNMP and is a protocol which is specified to transmit statistic information regarding the abnormal flow or the distinctive flow among the traffics to the manager. The AFM does not have the same database as the MIB of the SNMP but has a database on an RAM (random access memory) which is a storing unit. Further, the AFM a small overhead of the operation for the control to search statistic information using a hash function and exchange information at a high speed so that it is possible to treat a large amount of traffics. In addition, the AFM treats information for every flow so that it is possible to acquire more specific information as compared with the SNMP.

The system according to the embodiment includes the integrated management server 103 that integratedly manages the entire system, the IMF 102 that collects the AFM transmitted from the plurality of routers 105 and detects the status change of the traffic from the information of the AFM, the client 101, and the server 104. Each of the routers 105 transmits the AFM to the IMF 102. The AFM mirrors each of ports of each of the routers, aggregates the mirrored information, and stores the information in the packet to be transmitted to the IMF 102. Therefore, the traffic that passes through the router 105 is not affected by the AFM.

The IMF 102 collects the AFM for every router 105 and differentiates the data of the AFM to analyze the failure for every router. Here, since a performance of the IMF 102 as hardware is limited, the number of routers which may be managed by the IMF 102 is also limited. Therefore, it is assumed that a plurality of IMFs 102 is provided in the system. When the failure is analyzed, the IMF 102 updates an expected value of a reference distribution which is a comparison target for the failure determination based on the failure determination of all of the managed routers 105 in consideration of the causal relationship of the routers 105 which are managed by the IMF 102. Each of the IMFs 102 collects the AFM that is transmitted from each of the routers which is a communication control device, analyzes the failure for every router 105, and transmits an alert to the integrated management server 103. The integrated management server 103 that receives the alert performs the control to optimally arrange a virtual switch or a virtual server on the network. The management server 103 in the data center illustrated in FIG. 1 controls to move the virtual server between the servers 104 or the data centers or rearrange the virtual switch.

Figure 2:
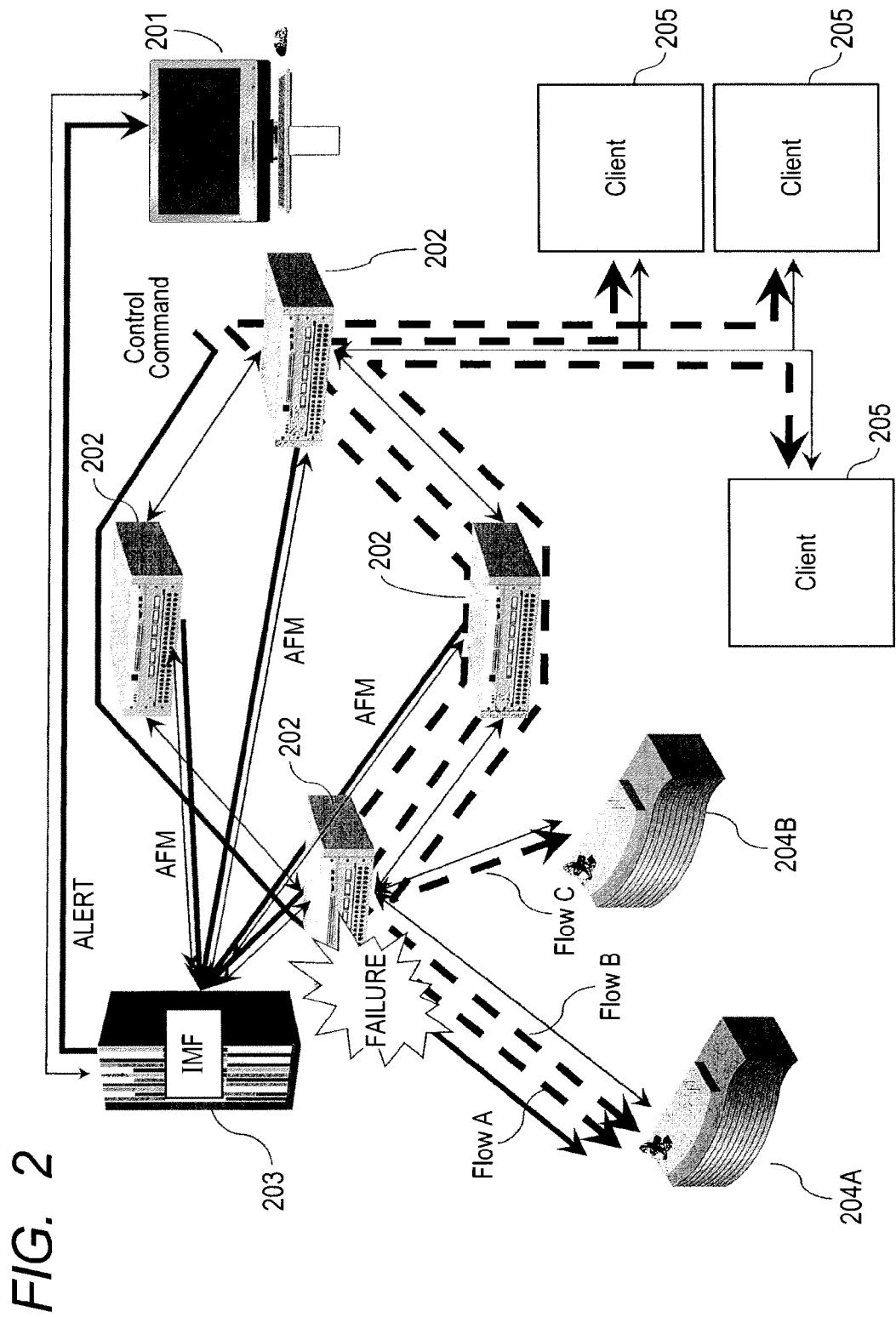
FIG. 2 is a schematic view of a system on a WAN according to the first embodiment.

FIG. 2 is a configuration view illustrating an example of a management system, on a WAN according to the embodiment. An integrated management server 201 is a system that controls and manages the virtual server and the virtual switch on the WAN. Similarly to FIG. 1, also in FIG. 2, the integrated management server 201 controls to optimally arrange the virtual server and the virtual switch between data centers 204A and 204B or servers based on the alert transmitted from the IMF 203 indicated by a thick solid line. Further, in FIG. 2, bidirectional dotted line arrows indicate flows Flow A, Flow B, and Flow C between each of clients 205 and the data centers 204A and 204B.

As an entire system, the integrated management server 103 in the data center illustrated in FIG. 1 and the integrated management server 201 on the WAN illustrated in FIG. 2 cooperate with each other to control the entire network. The integrated management server 201 on the WAN is defined as a parent management server of an integrated management server and the management server 103 in the data center is defined as a child management server. The parent management server 201 only selects a control unit for optimization but the child management server 103 performs the actual control. The parent management server 201 periodically inquires the child management server 103 to perform an optimized algorithm based on information transmitted from the IMF 203.

Figure 3:
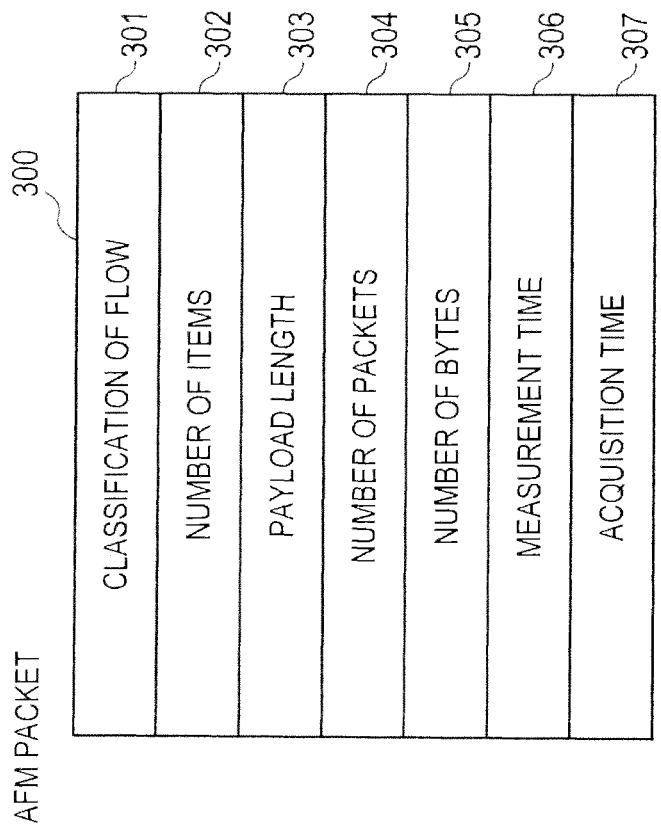
FIG. 3 is a schematic view illustrating an example of a packet of an AFM according to the first embodiment.

FIG. 3 illustrates an example of a format of an AFM packet that transmits the information of the AFM used in the embodiment. In many cases, a general flow is defined as a set of packets whose values of 5-tuples (a transmission source IP address, a destination IP address, a protocol, a transmission source port number, and a destination port number) among items included in an IP header or a TCP/UDP (transmission control protocol/user datagram protocol) header match. In the AFM, the definition is extended, a set of packets whose arbitrary n-tuples match is defined as an aggregation flow and statistic information such as the number of packets or the number of bytes is collected in the unit of the aggregation flow. If a concept of the aggregation flow is introduced, for example, a traffic which flows between one to n hosts such as a DDoS (distribute denial of service) attack or network scan is considered as a single flow so that statistic information is obtained and it is possible to more easily find a behavior of the traffic which flows on the network.

The AFM packet 300 of FIG. 3 is configured by a classification 301 of a flow, a number of items 302, a payload length 303, a number of packets 304, a number of bytes 305, a measurement time 306, and an acquisition time 307 and transmits information necessary to detect an abnormal flow to the IMFs 102 and 203.

Figure 4:
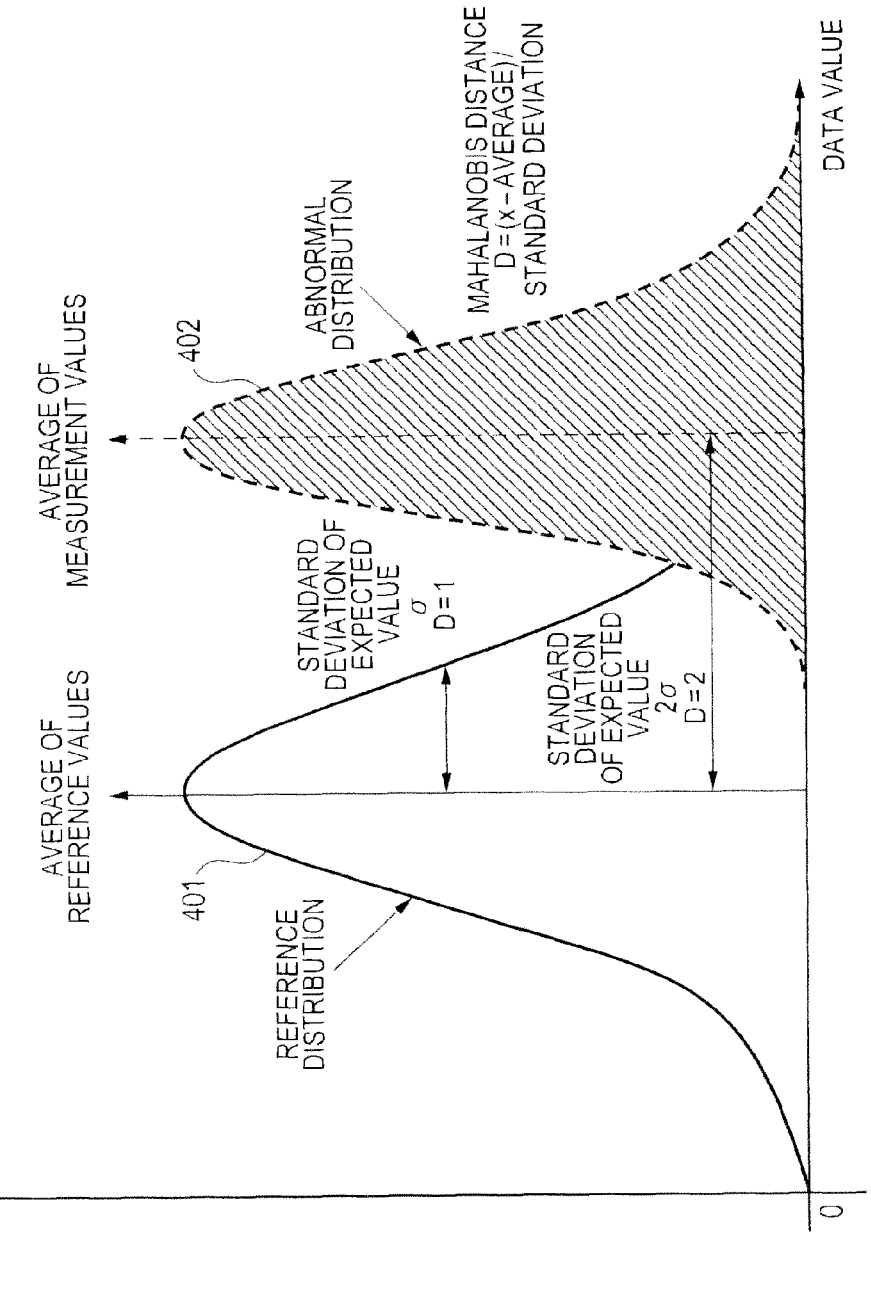
FIG. 4 is a view explaining a schema for performing comparison verification in the first embodiment.

FIG. 4 is a view explaining an abnormality determining method when the IMFs 102 and 203 of the embodiment analyze the failure. Further, a specific embodiment of the internal configuration of the IMFs 102 and 203 will be described below with reference to FIG. 10. The IMF needs to determine whether the traffic which flows on the network is normal to analyze the failure. In the embodiment, a method that determines whether a state of entire flows which flow on the network is normal is used. FIG. 4 illustrates a distribution which is plotted using analysis parameter measurement values of entire flows on the network at a predetermined time. A horizontal axis of FIG. 4 indicates a data value and a vertical axis indicates a probability density.

First, in FIG. 4, an average value and a standard deviation of a reference distribution 401 which is a comparison target are set as initial values. These distributions indicate a distribution for every flow. For example, when a network traffic is defined as the analysis parameter, an average value of the network traffic is set to 32 [kbit/s] and the standard deviation is set to 32 [kbit/s]. These values are based on approximately a value of 32 [kbit/s] which is an amount of traffic for every one contractor in Japan which is suggested by Bureau for developing an integrated communications infrastructure of Ministry of Internal Affairs and Communications on September of 2010.

Continuously, the IMFs 102 and 203 acquire required statistic Information from the AFM of each of the routers 105 to determine the abnormality of the traffic that flows on the network. Thereafter, the IMFs calculate an absolute value of the Mahalanobis distance with respect to the reference distribution for every acquired data.

An equation of the Mahalanobis distance is as follows:

$$D=(x-\text{average})/\text{standard deviation [a.u.]} \quad \text{(Equation 1)}$$

It is understood that if the value of the Mahalanobis distance obtained from Equation 1 is sufficiently distant from zero, the data is deviated from the reference distribution which is the comparison target. With respect to the distribution, after calculating the Mahalanobis distance of the flows, an average value of the Mahalanobis distances of all flows is calculated. If the distribution follows a normal distribution, the distribution in which the calculated average value of the Mahalanobis distances is 2 or higher is presumed to be insignificant based on a level of significance of 5%, as illustrated in a distribution 402 of FIG. 4. In other words, the distribution is considered as an abnormal distribution which is generated at a probability of 5%. As described above, the abnormality of the distribution may be detected to detect the abnormality from the distribution of entire traffics which flow in the router which transmits the AFM.

Figure 5:
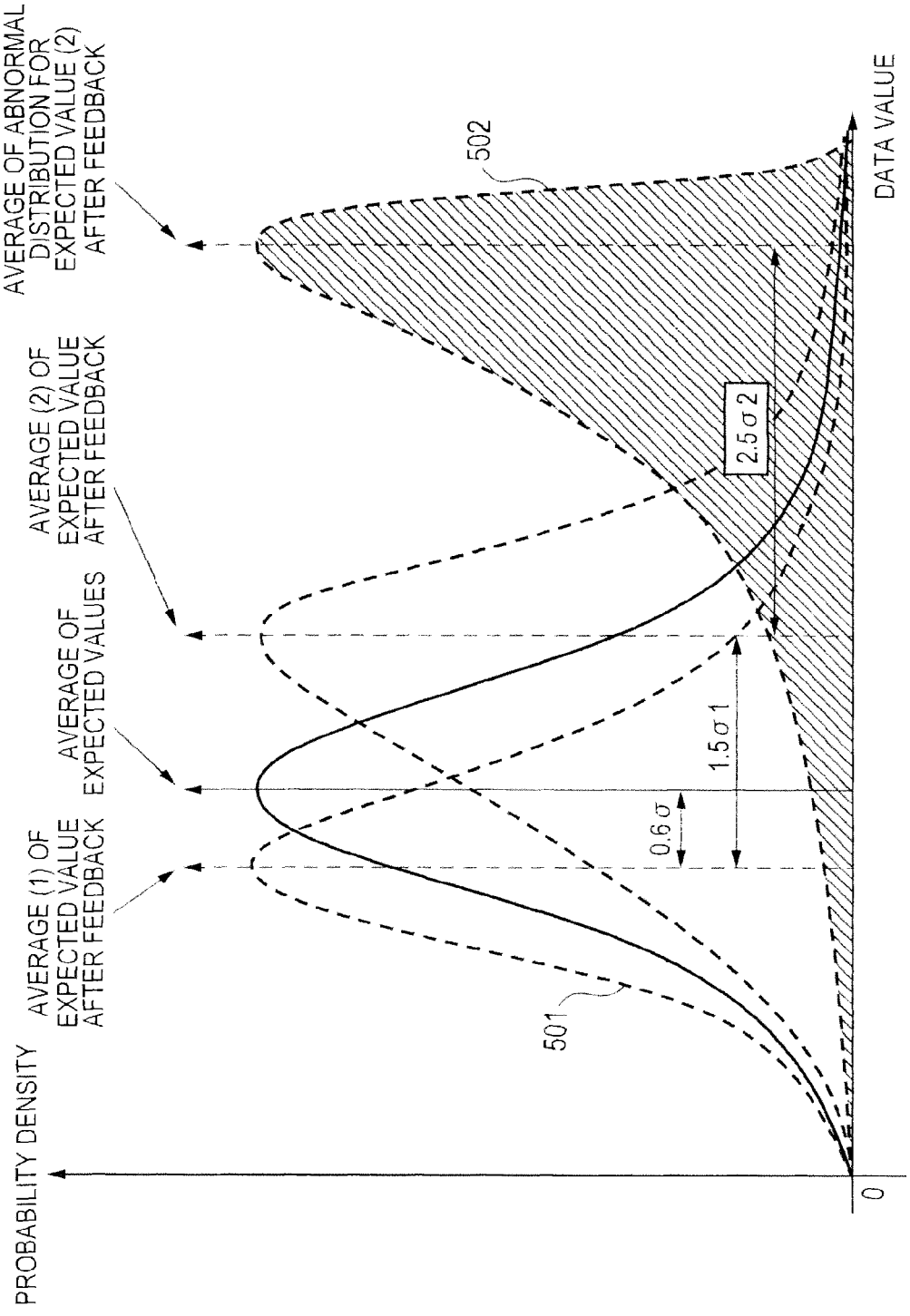
FIG. 5 is a schematic explaining view of a method of performing a feedback of a reference distribution in an improved configuration of the first embodiment.

FIG. 5 is a view explaining a modification embodiment for improving a precision of a traffic abnormality determining method using a Mahalanobis distance of the first embodiment described above. Since the traffic varies from moment to moment, it is difficult to define a normal value in the traffic. The modification embodiment relates to a method of updating a reference distribution by always applying feedback to the reference distribution which is a comparison reference when performing the abnormality determination which is performed by processing units of the IMFs 102 and 202 which will be described below. In other words, the modification embodiment relates to a method of updating an expected value of the reference distribution 501 which is the comparison target. In the modified embodiment, an average value and a standard deviation of the reference distribution which is defined based on past data are compared with those of the distribution of data collected in real time to calculate the Mahalanobis distance.

Data of the AFM is collected by the IMFs 102 and 203, an average and a standard deviation of the distribution of the collected data are calculated, and moving averages of an average value and a standard deviation of the reference distribution are acquired.

The calculating equations of the moving average are represented by the following Equations 2 and 3.

$$\text{Moving average of average}=(\text{average of reference distribution}+\text{average of distribution of data acquired by AFM})/2 \quad \text{(Equation 2)}$$

$$\text{Moving average of standard deviation}=(\text{standard deviation of reference distribution}+\text{standard deviation of distribution of data acquired by AFM})/2 \quad \text{(Equation 3)}$$

From the acquired Equations 2 and 3, the moving average of the average after feedback is defined as an average of a new reference distribution and the moving average of the standard deviation is defined as a standard deviation of the new reference distribution. In FIG. 5, averages ((1) and (2)) of expected values after feedback are illustrated and an average of an abnormality distribution for the average of the expected value ((2)) is illustrated.

Based on a reference distribution 501 which is newly defined based on the past data, the comparison verification with data of the AFM which is newly acquired in real time is performed. The Mahalanobis distance for the newly acquired data of the AFM is calculated based on the average and the standard deviation of the reference distribution set when performing the comparison verification. If the distribution follows a normal distribution, the distribution in which the calculated average value of the Mahalanobis distances is 2 or higher is presumed to be insignificant using a level of significance of 5% and the distribution is considered as an abnormal distribution 502 which is generated at a probability of 5%.

As described above, the feedback is applied to the average value and the standard deviation of the reference distribution, the moving averages of the average value and the standard deviation of the reference distribution are acquired to update the average value and the standard deviation of the reference distribution. Further, a distribution which is significantly deviated from the moving average is estimated as an abnormal distribution to estimate that an abnormal event which is significantly deviated from a linear event occurs. Generally, an event such as occurrence of a call almost independently occurs. However, in case when a correlation of the event is sharply increased, it is understood that an event which cannot be generally considered occurs. For example, if the traffic is considered as an axis, the event which cannot generally occur is generated and thus a plurality of traffics is sharply increased. As an example of the event which cannot generally occur, there is an event when the correlation value is sharply increased, such as an example when people concurrently communicate with family members or friends using cell phones at a Meiji Shrine at midnight on the first day of New year so that no communication using the cell phones is performed.

In the modification embodiment, when the feedback is performed, a linear event is defined as a reference distribution. Therefore, a moving average for the abnormality event which is a nonlinear event is not updated. In other words, if it is determined that the abnormality occurs, it is suppressed to update the reference distribution by the measured value. Further, in each of the routers which is managed by the IMFs 102 and 203, if the abnormal event occurs even in one router, the feedback for the average value and the standard deviation value of the reference distribution of the other managed routers is not performed. In other words, expected values of the average value and the standard deviation value of the reference distribution which is the comparison target are updated while considering the causal relationship with the other routers in the system. In addition, when the expected values of the average value and the standard deviation value of the reference distribution are updated, if the router which is managed by the IMFs 102 and 203 is one, the expected value of the reference distribution is updated by the abnormality determination for the one router. According to the modification embodiment, it is possible to track the traffic in real time, update a normal value of the traffic, and perform precise abnormality determination for the distribution for entire traffics which flow on the network.

Figure 6:
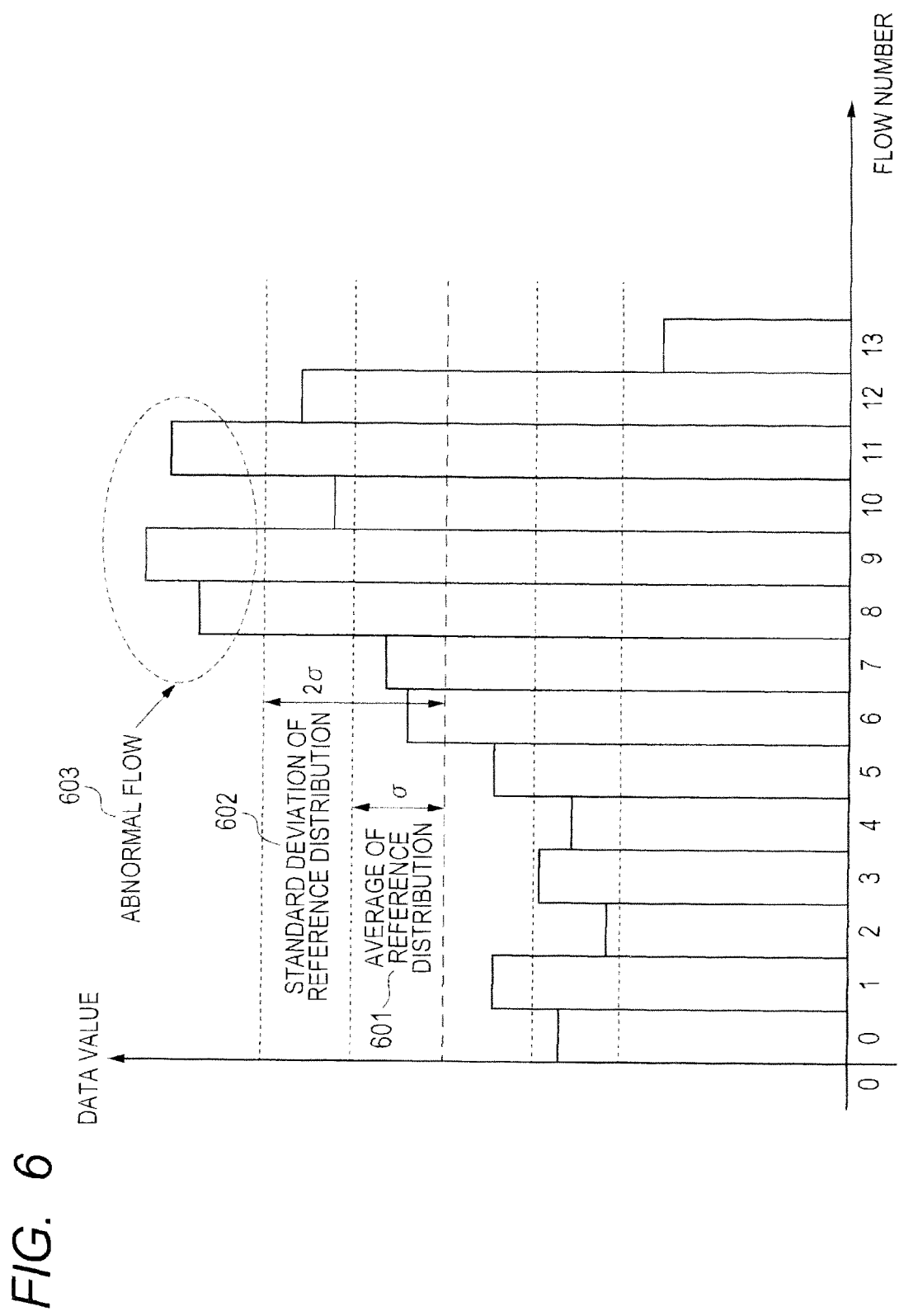
FIG. 6 is a schematic view of detecting an abnormality flow in the first embodiment.

Continuously, a method that specifies a failure factor which causes troubles when it is determined that the status is abnormal for entire traffics will be described with reference to FIG. 6. FIG. 6 is a view explaining a method that specifies an abnormal traffic from statistic data acquired from the AFM. In FIG. 6, a horizontal axis indicates a number of flows and a vertical axis indicates a data value of each of the flows.

An evaluation equation that specifies the abnormal flow 603 is represented by the following equation.

Avg(reference distribution)+2σ(reference distribution) <flow data (Equation 4)

If it is determined that the distribution calculated using the AFM is an abnormal distribution, a traffic which is larger than the average value 601 of the reference distribution by 2σ or more is estimated as an abnormal traffic using the average value 601 and the standard deviation σ (602) of the reference distribution as represented in Equation 4. In FIG. 6, when the abnormal flow 603 is specified, 2σ is used as an example of a threshold value. However, the threshold value is a parameter which may be set by the manager of the IMFs 102 and 203. Even though 2σ is used as an example of a main threshold value, if the distribution follows the normal distribution, the flow is a flow that occurs only at a probability of 5% with respect to a considered traffic model with a level of significance of 5% and thus is estimated as an abnormal flow. In other words, in the embodiment, it is determined that the abnormal distribution occurs due to the abnormal flow.

As described above, the situation of the traffic is always monitored, the feedback with respect to the situation of the traffic is applied to be studied, and the studied reference distribution is compared with the real-time traffic when performing the comparison verification, for every analysis parameter.

Second Embodiment

Continuously, as a second embodiment, a failure analysis system, by multidimensional analysis will be described. In the abnormality determining method in the failure analysis system, it is required to increase the precision of the abnormality determination to prevent an erroneous detection. In the analysis in which erroneous detection frequently occurs, the amount of alerts which are transmitted to the management server is increased and a possibility that an erroneous operation or shut down of the management server is caused is high.

Figure 7:
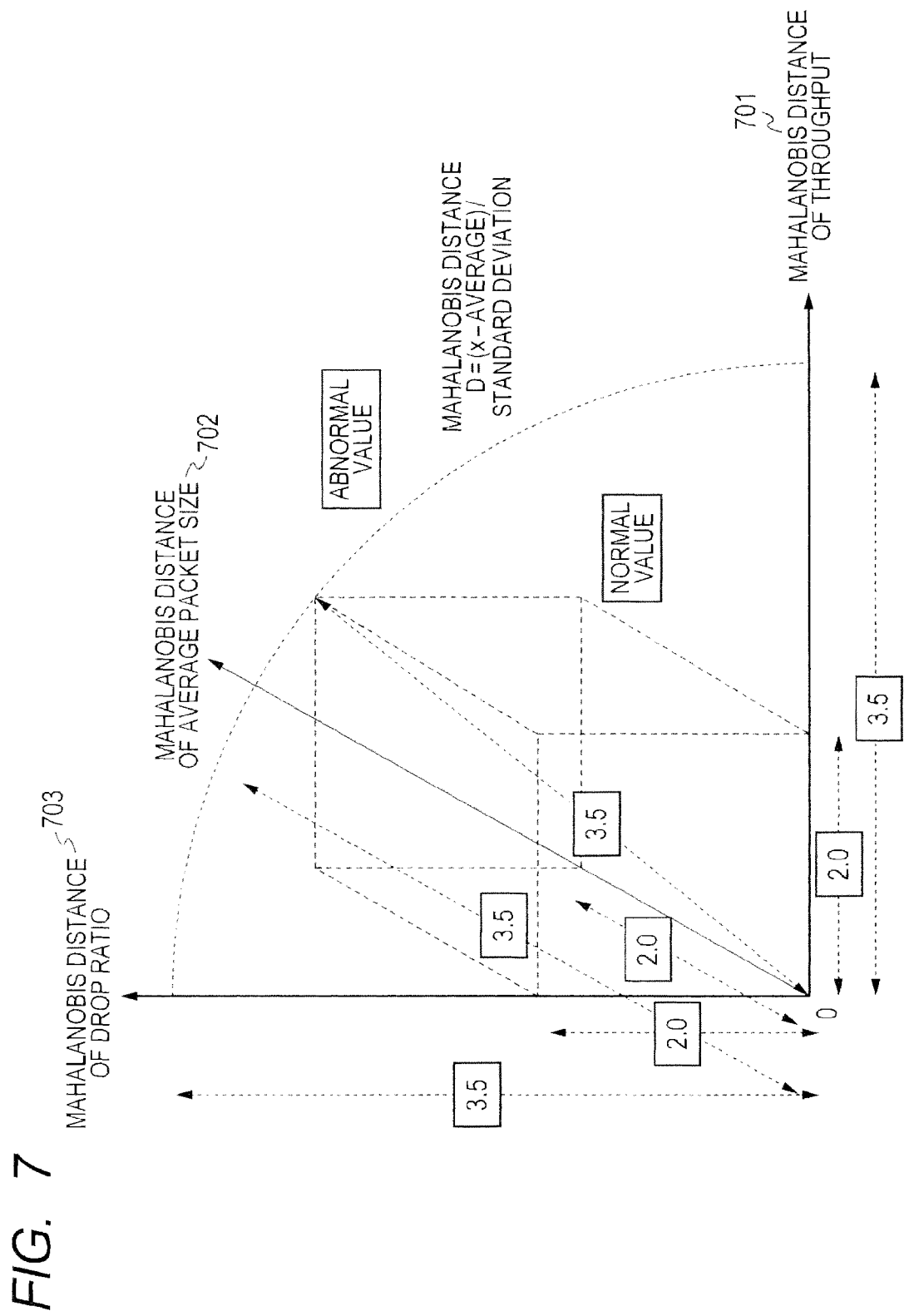
FIG. 7 is a schematic explaining view of a method of inspecting a Mahalanobis distance in a three-dimension according to a second embodiment.

FIG. 7 is a view illustrating a schematic view of a failure analysis system based on the three-dimensional analysis using the Mahalanobis distance. Axes which are adopted in FIG. 7 include three axes of a throughput 701, an average packet size 702, and a drop ratio 703. As described above, the Mahalanobis distance for data acquired by the AFM for every axis is calculated using the average value and the standard deviation of the reference distribution. Further, a three-dimensional distance for the Mahalanobis distance calculated for every axis is calculated.

In the embodiment, the calculating equation is defined as the following equations, Three dimensional Mahalanobis distance=sqrt($\alpha$*$x^2$+ $\beta$*$y^2$+$\gamma$*$z^2$) (Equation 5)

$\alpha$+$\beta$+$\gamma$=3 (Equation 6)

Here, an X-axis is defined as a Mahalanobis distance of the drop ratio, a y-axis is defined as a Mahalanobis distance of the average packet size, and a z-axis is defined as a Mahalanobis distance of the throughput. Here, $\alpha$, $\beta$, and $\gamma$ are weights of the axes. The parameter of the weight of each of the axes is changed with respect to the failure to more correctly detect the failure. Based on the above equations, the three-dimensional Mahalanobis distance is calculated and then the abnormality determination is performed using the three-dimensional Mahalanobis distance. As a threshold value of the three-dimensional Mahalanobis distance, 3.5 is defined.

A threshold value which is considered to be abnormal for every axis is 2.0. If the threshold value is three-dimensionally reduced, the threshold value is defined by the following Equation.

Sqrt($2^2$+$2^2$+$2^2$)2*sqrt(3)≈3.5 (Equation 7)

In the embodiment, when the average value of the three-dimensional Mahalanobis distance is calculated using the threshold value, the abnormality determination is performed depending on whether the average value exceeds 3.5. As described above, a dimensional number that performs, the abnormality determination is increased to comprehensively perform the failure determination.

Further, abnormality determination on the erroneous detection which is caused by the abnormality determination of the one-dimensional axis is comprehensively performed at the multidimensional axes so that it is possible to precisely perform the determination. For example, when the distribution at any one of the axes is determined, to be abnormal and the distributions at the other two axes is determined to be normal, if the distribution is comprehensively and three-dimensionally determined, the distribution is determined to be normal. As described above, the erroneous detection which may occur when the abnormality determination is one-dimensionally performed may be prevented by three-dimensionally performing the abnormality determination. In the second embodiment as described above, an example that three-dimensionally performs the abnormality determination is disclosed. However, the dimension of the abnormality determination may be reduced to a two-dimension or extend to a higher dimension such as tour-dimension or five-dimension.

Continuously, a specific configuration example of the IMFs 102 and 203 in each of the above-described embodiments and an operational processing thereof will be described with reference to FIGS. 8 to 10.

Figure 8:
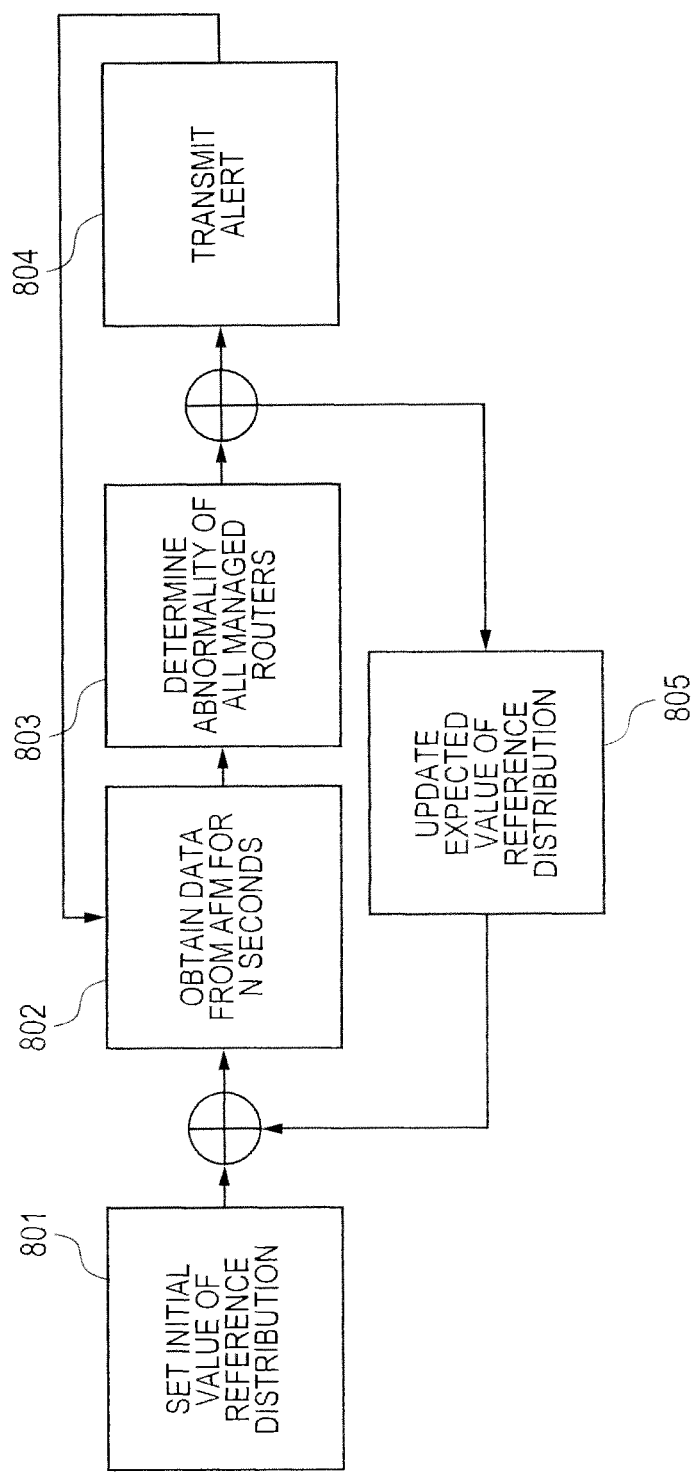
FIG. 8 is a functional block diagram for explaining one functional configuration of an IMF in a failure analysis system according to each of embodiments.

FIG. 8 is a block diagram explaining an example of a functional processing of the IMFs 102 and 203. First, when the IMF performs the control, the IMF sets an initial value of the reference distribution which is the comparison target (801). Thereafter, the IMF collects data for performing statistic processing using the AFM of each of the routers (302). The Mahalanobis distance for the reference distribution for every axis is calculated for every router and then the abnormality determination is performed on every router which is managed (803). If a router in which the abnormal distribution is detected is present in the managed routers, an expected value of the reference distribution is not updated for all routers which are managed by the IMF. Thereafter, if the abnormality is detected, an alert is transmitted to the management server (804). Alternatively, if no abnormality is detected for all routers which are managed, the expected value of the reference distribution is updated (605). Further, it is obvious that the updating process (805) of the expected value of the reference distribution corresponds to the modification embodiment of the first embodiment that uses the feedback. As described above, it is determined whether to update the expected value of the reference distribution to perform the comparison verification in each of the routers while considering the dependence relationship of the mutual relationship of the routers which are managed so that the erroneous detection is further reduced.

Figure 9:
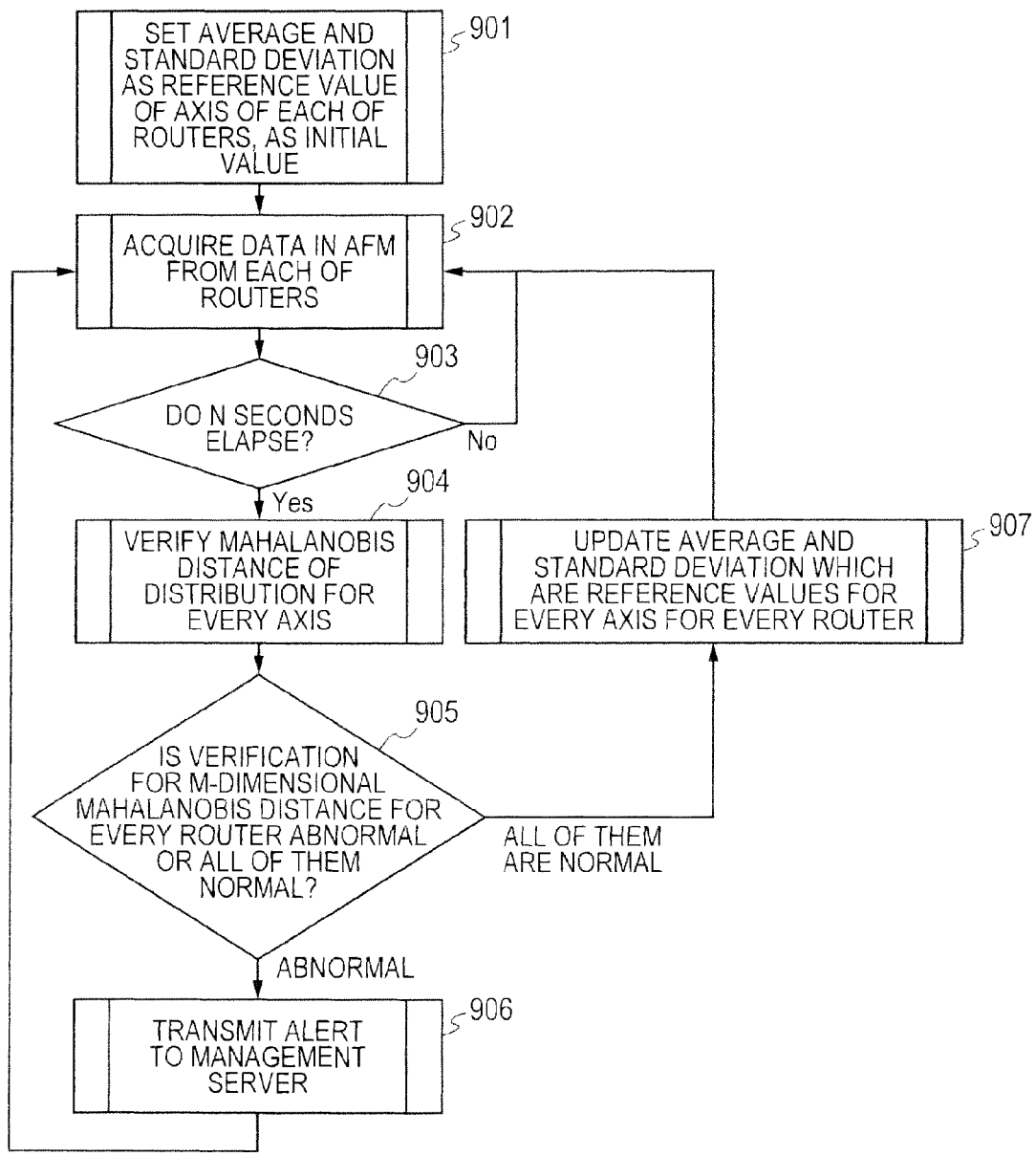
FIG. 9 is a flow chart of the IMF in each of the embodiments.

FIG. 9 illustrates a flow chart explaining an example of a control method of the IMFs 102 and 203. First, the IMFs 102 and 203 set an average and a standard deviation as a reference value of each of the axes of each of the routers as an initial value to perform, control (901). After setting the average and the standard deviation, the IMF is started up and data for every flow is acquired, from each of the routers to the AFM (902). The AFM collects the statistic information of each of the routers and transmits the information to the IMF. The IMF stores the acquired information in an internal database. The IMF stores the Information of the AFM which is transmitted from each of the routers for N seconds (903). The abnormality determination is performed by calculating the M-dimensional Mahalanobis distance using an analysis parameter which is assigned to every router. If one of the routers which are managed is determined to be abnormal based on the result of the abnormality determination, the expected value of the reference value is not updated (905). Here, it is obvious that the M-dimension refers to all dimensions of 1 or larger. If M is 2 or larger, the M-dimension corresponds to the multiple dimension of the second embodiment. If the abnormality is detected, an alert is transmitted to the management server (907). If all routers which are managed are normal in the abnormality determination, the expected value of the reference value is updated (906). The updating process (906) corresponds to the updating process (805) of FIG. 8.

Figure 10:
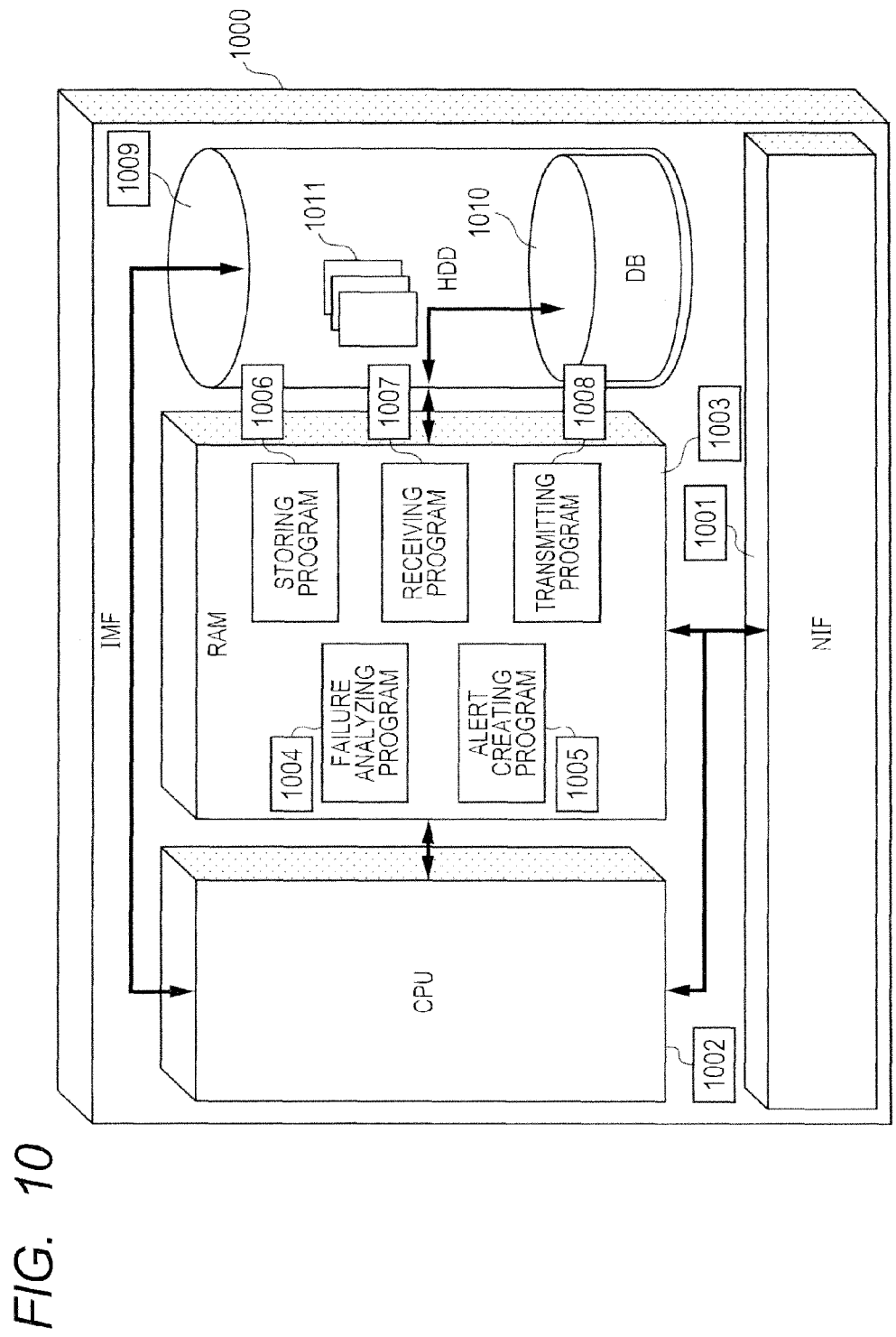
FIG. 10 is a view illustrating an example of a block configuration in the IMF in each of the embodiments.

FIG. 10 illustrates a configuration view of an embodiment of the IMFs 102 and 203 in the failure analysis system of each of the embodiments. An IMF 1000 is a server and includes a general computer configuration. The IMF 1000 includes a CPU (central processing unit) 1002 that configures a processing unit, an RAM (random access memory) 1003 and a HDD (hard disk drive) 1009 which configure a storing unit, and a NIF (network interface) 1001. The RAM 1003 stores a receiving program 1003 which serves as a receiving unit, a transmitting program 1008 which serves as a transmitting unit, a storing program 1006 which serves as a storage unit, a failure analyzing program 1004 which serves as a failure analyzing unit, and an alert creating program 1005 which serves as an alert creating unit. In the IMF 1000, the CPU 1002 sequentially reads out the programs which configure the functional units from the program 1011 stored in the HDD 1009 and expands the programs on the RAM 1003 to be driven.

Further, in the specification, description of the internal configuration of the components that configure the failure analysis system of FIGS. 1 and 2 other than the above-described IMF has been omitted. However, the clients 101 and 205, the management servers 103 and 201, the servers 104, and the routers 105 and 202 have the basic configuration of the computer illustrated in FIG. 10. In addition, the routers 105 and 202 which are communication control devices to interconnect two or more different networks include the functional blocks and the programs to implement the function to create the AFM to be transmitted to the above-described IMFs 102 and 203 in addition to the configuration as the communication control device on a general network such as a packet buffer, a route table, or a flow controller. The routers 105 and 202 create the AFM by allowing the processing unit to execute the program to transmit the AFM to the IMFs 102 and 203. An example of the configuration of the communication control device which has an AFM creating function is disclosed in detail in Japanese Patent Application Laid-Open Publication No. 2006-314077 described above.

The receiving program 1007 of FIG. 10 is a block which serves as a receiving unit that receives the AFM transmitted from each of the routers via the NIF (network interface) 1001. The transmitting program 1008 is a block which serves as a transmitting unit that transmits an alert issued to the management server or a command issued to the router. The storing program 1006 processes the statistic information received from the AFM as data corresponding to a management table on the database 1010 and then stores the data in the database 1010. As a parameter on the management table, the statistic information is assigned for every router and the assigned statistic information is assigned to an analysis parameter for every failure to create the management table. Further, to understand the causal relationship between the routers which are managed by the IMF 1000, topology information for entire network from an NMS (network management system) is stored in the database.

The failure analyzing program 1004 acquires an analysis parameter from the management table on the database 1010, calculates the Mahalanobis distance for the reference distribution for every analysis parameter, and then comprehensively analyzes every failure. The abnormality determination is performed on every router. If even one router which is abnormal is present in the managed routers, as described above, the expected value of the reference value of all managed routers is not updated. Further, if the abnormality determination is not performed on all managed routers, the expected value of the reference distribution of all routers is updated.

The alert creating program 1005 which serves as an alert creating unit contains an IP address of the router which is determined to be abnormal by the failure analyzing program 1004, an IP address of a source of a flow which causes the trouble, and an IP address of a destination in an alert packet and transmits the IP addresses to the management server. Further, the alert creating program 1005 defines and determines a level and a stage of the alert. As an example of the determined alert level, if the alert is divided into three stages, a danger alert whose alert level is the highest is transmitted for a failure where the network is disconnected due to congestion or the interconnection is disconnected due to deterioration, a warning alert is transmitted for an event when a flow is minutely discarded or a throughput is raised, and specifically, a safety alert is transmitted when there is no failure in the network.

FIG. 11 illustrates an example of a management table 1101 which is managed by the IMF 1000 as a database 1010. The management table 1101 is configured for every router by a reference distribution which is a comparison target for every router and a group of data of the flows that pass through the routers. As the reference distribution, an average and a standard deviation of the distribution with various analysis parameters are disclosed. In the embodiment, examples of the analysis parameter 1101 include an average packet size, a throughput, and a drop ratio. The average and the standard deviation which are the reference distribution for the distribution are managed on the table 1101.

Further, information for every flow Flow 1, Flow 2, ... is stored. As the information for every flow, in addition to the average packet size, the throughput, and the drop ratio which are the analysis parameters, a source IP, a destination IP, a source port, and a destination port are stored as information. Based on the information for every flow, the storing program unit 1006 of the IMF calculates the statistic distribution with respect to the analysis parameters of the event and updates the management table 1101.

FIGS. 12A, 12B to 15A, and 15B illustrate data of the drop ratio, the throughput, and the average packet size and a calculation result of the Mahalanobis distance with respect to the reference distribution calculated in the IMF as the statistic information which is transmitted from the AFM from each of the embodiments described above. All of the calculation results are absolute values.

Figure 12A:
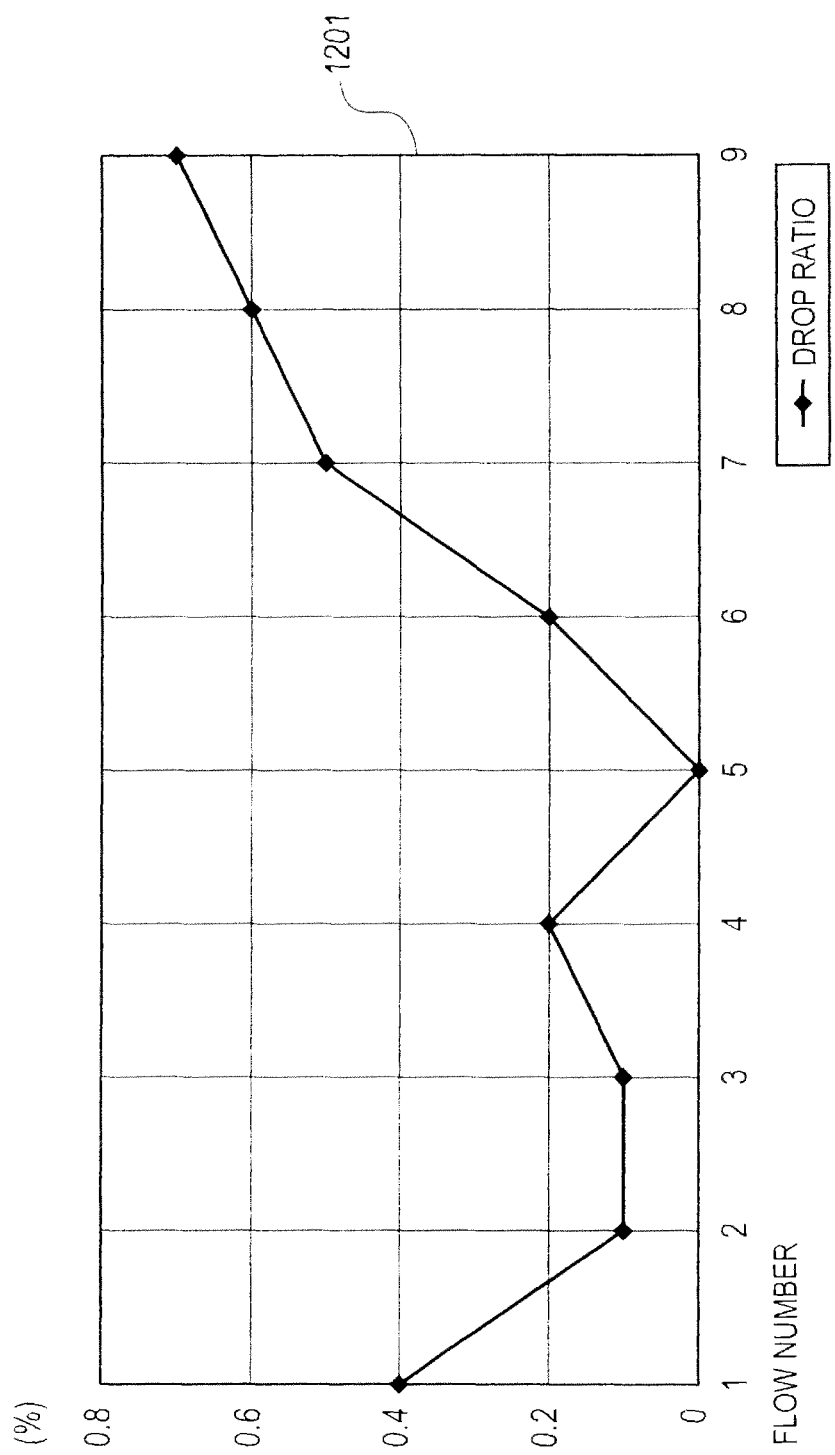
FIG. 12A is a view illustrating a graph of data of a drop ratio in each of the embodiments.

FIGS. 12A and 12B illustrate a graph 1201 and data 1202 which represent the result of the drop ratio, respectively. Hereafter, excepting FIGS. 20A and 20B, graphs and data are illustrated in the drawings. Nine flows are used as a sample. Further, as a reference distribution, an average value is set to 0.2 and a standard deviation is set to 0.2. An average value of the Mahalanobis distance for the reference distribution of the drop ratio used in the example is 0.99. Since a value of the Mahalanobis distance at 2σ in the distribution is 2, if the distribution follows the normal distribution, the distribution is generated at a probability of a level of significance of 5% or higher. Therefore, it is determined that the distribution of the drop ratio is normal. In the example, even though the average value of the reference distribution is set to 0.2 and the standard distribution is set to 0.2, these values do not have a theoretical basis. Further, since the Mahalanobis distance of a flow whose flow number is 9 is 2.5 and thus the Mahalanobis distance has a value of 2 or larger, the flow is specified as an abnormal flow.

Figure 13A:
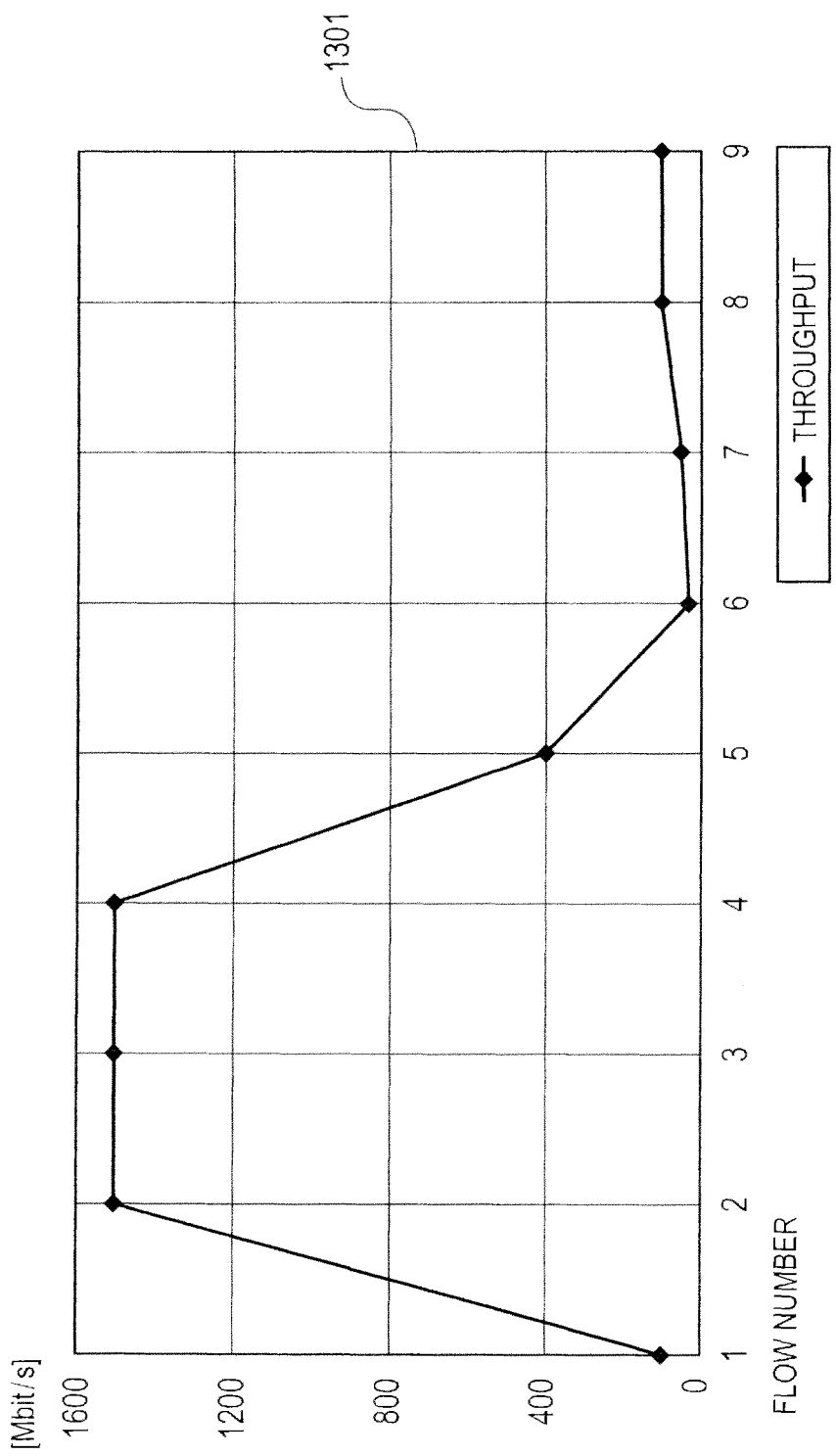
FIG. 13A is a view illustrating a graph of data of a throughput in each of the embodiments.

FIGS. 13A and 13B illustrate results 1301 and 1302 of the throughput. Nine flows are used as a sample. Further, as a reference distribution, an average value is set to 200 [Mbit/s] and a standard deviation is set to 200 [Mbit/s]. An average value of the Mahalanobis distances for the throughput used in the example is 2.59. Since a value of the Mahalanobis distance at 2σ in the distribution is 2, if the distribution follows the normal distribution, the distribution is generated at a probability of a level of significance of 5% or lower. Therefore, it is determined that the distribution of the throughput is abnormal. In addition, since the Mahalanobis distance of flows whose flow numbers are 2, 3, and 4 is 6.5 and thus the Mahalanobis distance has a value of 2 or larger, the flows are specified as abnormal flows.

FIGS. 14A and 14B illustrate results (1401 and 1402) of the average packet size. Nine flows are used as a sample. Further, as a reference distribution, an average value is set to 300 and a standard deviation is set to 300. An average value of the Mahalanobis distance for the average packet size used in the example is 0.88. Since a value of the Mahalanobis distance at 2σ in the distribution is 2, if the distribution follows the normal distribution, the distribution is generated at a probability of a level of a significance of 5% or higher. Therefore, it is determined that the distribution of the throughput is normal. In addition, since the Mahalanobis distance of a flow whose flow number is 2 has a value of 2 or larger, the flow is specified as an abnormal flow.

Figure 15A:
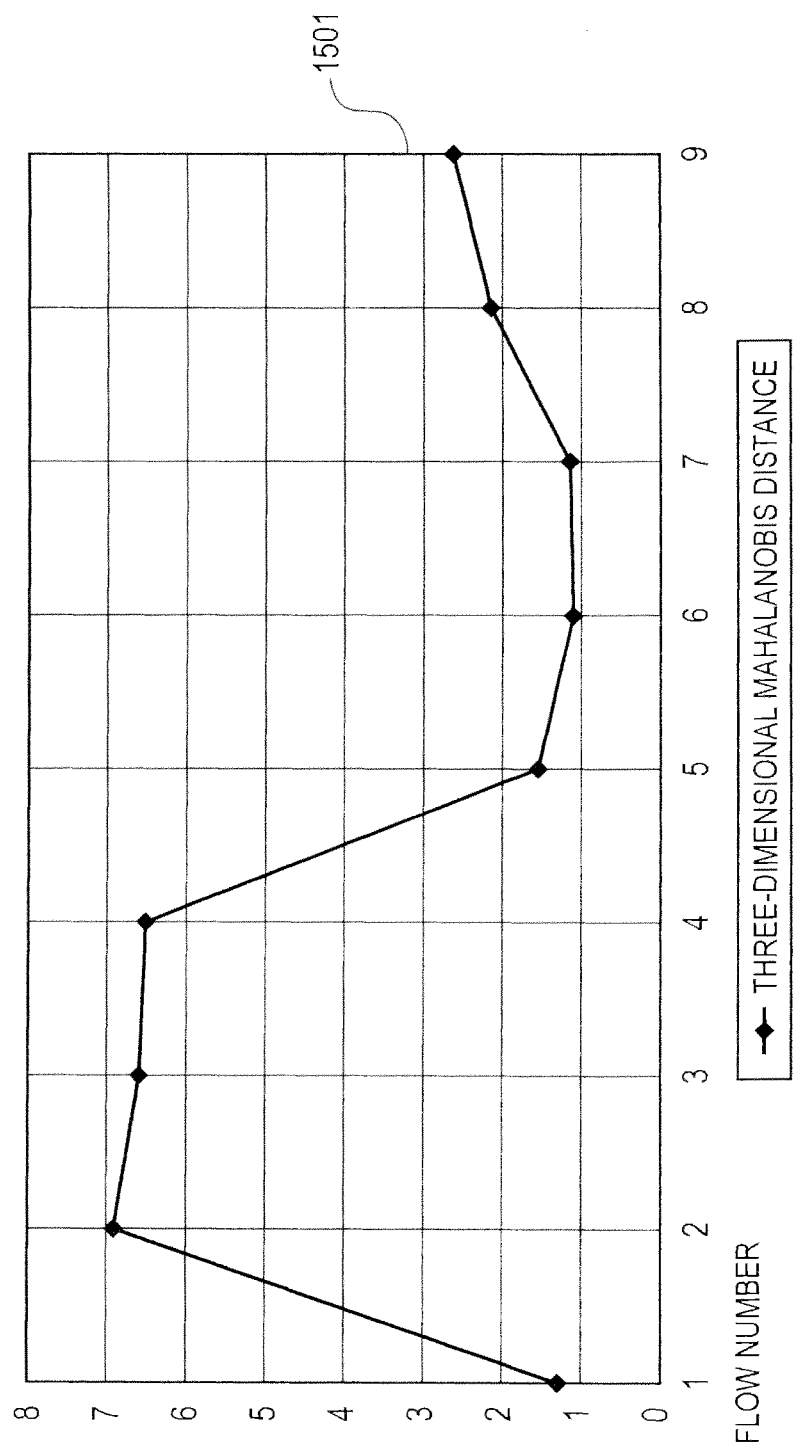
FIG. 15A is a view illustrating a graph of data of a three dimensional Mahalanobis distance in each of the embodiments.

FIGS. 15A and 15B illustrate a graph 1501 explaining a method that comprehensively and three-dimensionally performs the abnormality determination using the drop ratio, the throughput, the average packet size and the Mahalanobis distance of three axes, and data thereof 1502. In the three-dimensionalization of the Mahalanobis distance in the example, an average value of the three-dimensionalized Mahalanobis distances is 3.41. In the one-dimensional distribution, if the threshold value for abnormality determination is 2σ, the threshold value of the three-dimensional Mahalanobis distance is sqrt(2*2+2*2+2*2)=2 sqrt(3)=3.46≈3.5. Therefore, if the distribution follows the normal distribution, the distribution is generated at a probability of a level of significance of 95%. Accordingly, the status distribution in the example is determined to be normal. If it is determined to be abnormal, a cause and a packet (alert) which contains an IP of the detected router are sent to the management server. The IMF performs the comprehensive failure analysis for every router using the statistic information of the AFM which is transmitted by the router. When it is determined that all routers which are managed by the IMF are normal by considering the causal relationship of other routers, she IMF updates the expected values of the average value and the standard deviation of the reference distribution to more precisely determine the abnormality.

FIGS. 16A, 16B to 19A and 19B illustrate graphs and data illustrating a calculation result of the Mahalanobis distance for a reference distribution when the expected values of the average value and the standard deviation of the reference distribution are updated to perform the abnormality determination. All of the calculation results are absolute values. The above result is a sample result based on the prediction not an actual measured value.

Figure 16A:
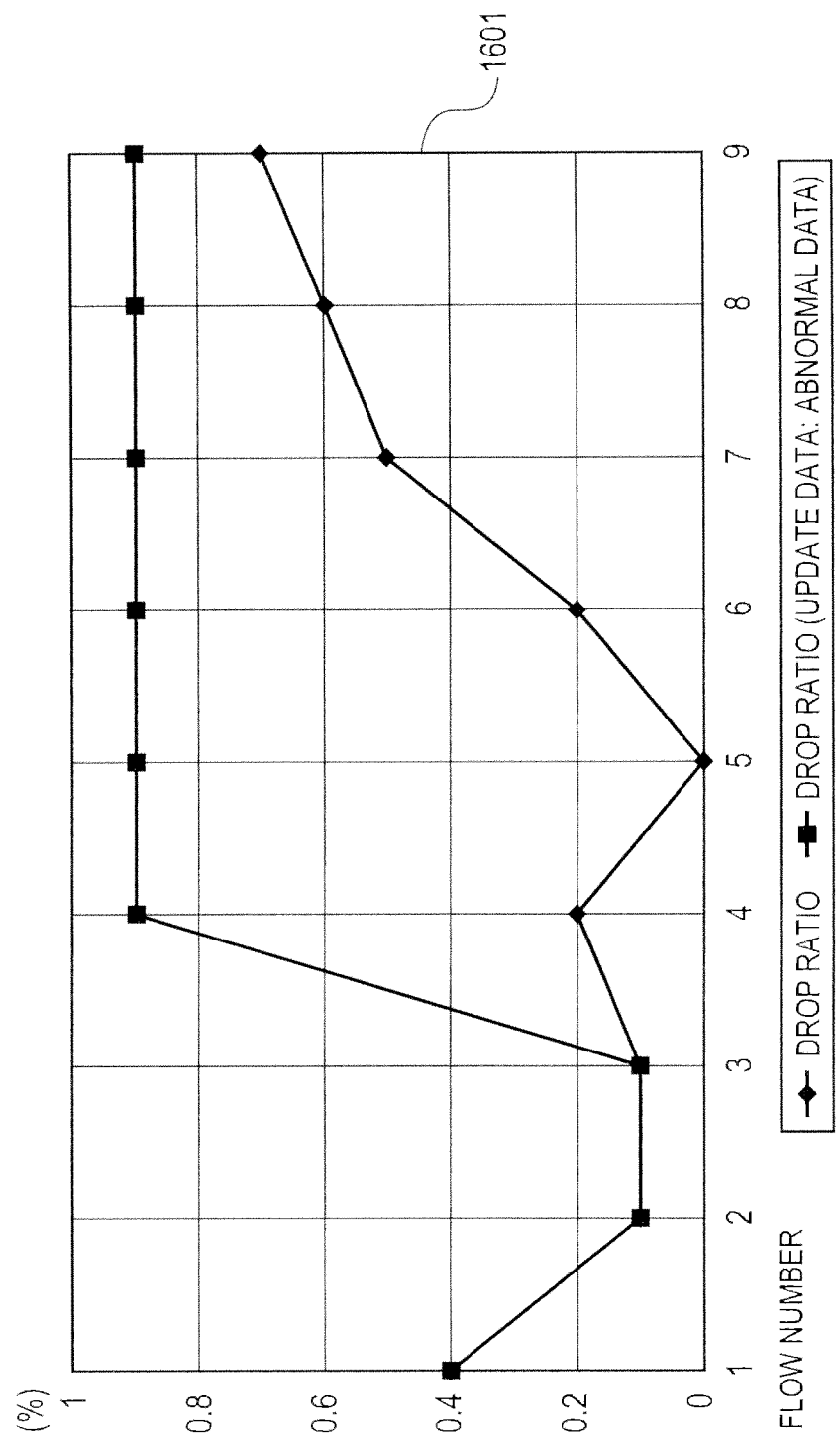
FIG. 16A is a view illustrating a graph of data of a drop ratio in each of the embodiments.

FIGS. 16A and 16B illustrate results (1601 and 1602) of a drop ratio. When the expected values of the average value and the standard deviation of the reference distribution of the drop ratio are updated, the Mahalanobis distance of the average for previous data is 0.95. The Mahalanobis distance for a previous expected value was 0.99. If the Mahalanobis distance is a significantly larger value than 0, it is understood that the value is deviated from the average and the standard deviation of the reference distribution. In the example, it is considered that since the expected value of the average value of the reference distribution and the expected value of the standard deviation are updated, the Mahalanobis distance for every data is reduced. Further, with respect to the expected value of the updated reference distribution, data of the drop ratio when it is determined to be abnormal is illustrated. Since the expected value of the reference distribution is updated, to be determined to be abnormal, a significantly deviated value is required. If six flows of 4 to 9 of nine flows show 0.9 as a drop ratio, the value is a deviated value.

FIGS. 17A and 17B illustrate results (1701 and 1702) of throughput. When the expected values of the average value and the standard deviation of the reference distribution with the throughput are updated, the Mahalanobis distance of the average for previous data is 1.27. The Mahalanobis distance for the expected value before being updated was 2.62, it is considered that since the expected values of the average value and the standard deviation of the reference distribution are updated, the Mahalanobis distance is reduced. Further, even when the throughput is determined as an abnormal distribution before updating the expected values of the average value and the standard deviation of the reference distribution, when the expected value is updated, the throughput is determined to be normal even in the same distribution. In addition, data of the throughput which is determined to be abnormal is illustrated with respect to the updated reference distribution. Since the expected value of the reference distribution is updated, to be determined to be abnormal, a significantly deviated value is required. If seven flows of 2 to 8 of nine flows show a throughput of 1.5 [Gbit/s], the value is a deviated value.

FIGS. 18A and 18B illustrate results (1801 and 1802; of the average packet size. When the expected values of the average value and the standard deviation of the reference distribution of the average packet size are updated, the Mahalanobis distance of the average for previous data is 0.82. The Mahalanobis distance for a previous expected value was 0.88. It is considered that since the expected values of the average value and the standard deviation of the reference distribution are updated, the Mahalanobis distance is reduced. Further, data of the throughput which is determined to be abnormal is illustrated with respect to the updated reference distribution. Since the expected value of the reference distribution is updated, to be determined to be abnormal, a significantly deviated value is required. If three flows of 2 to 4 of nine flows show the average packet size of 1000 [byte], the value is a deviated value.

Figure 19A:
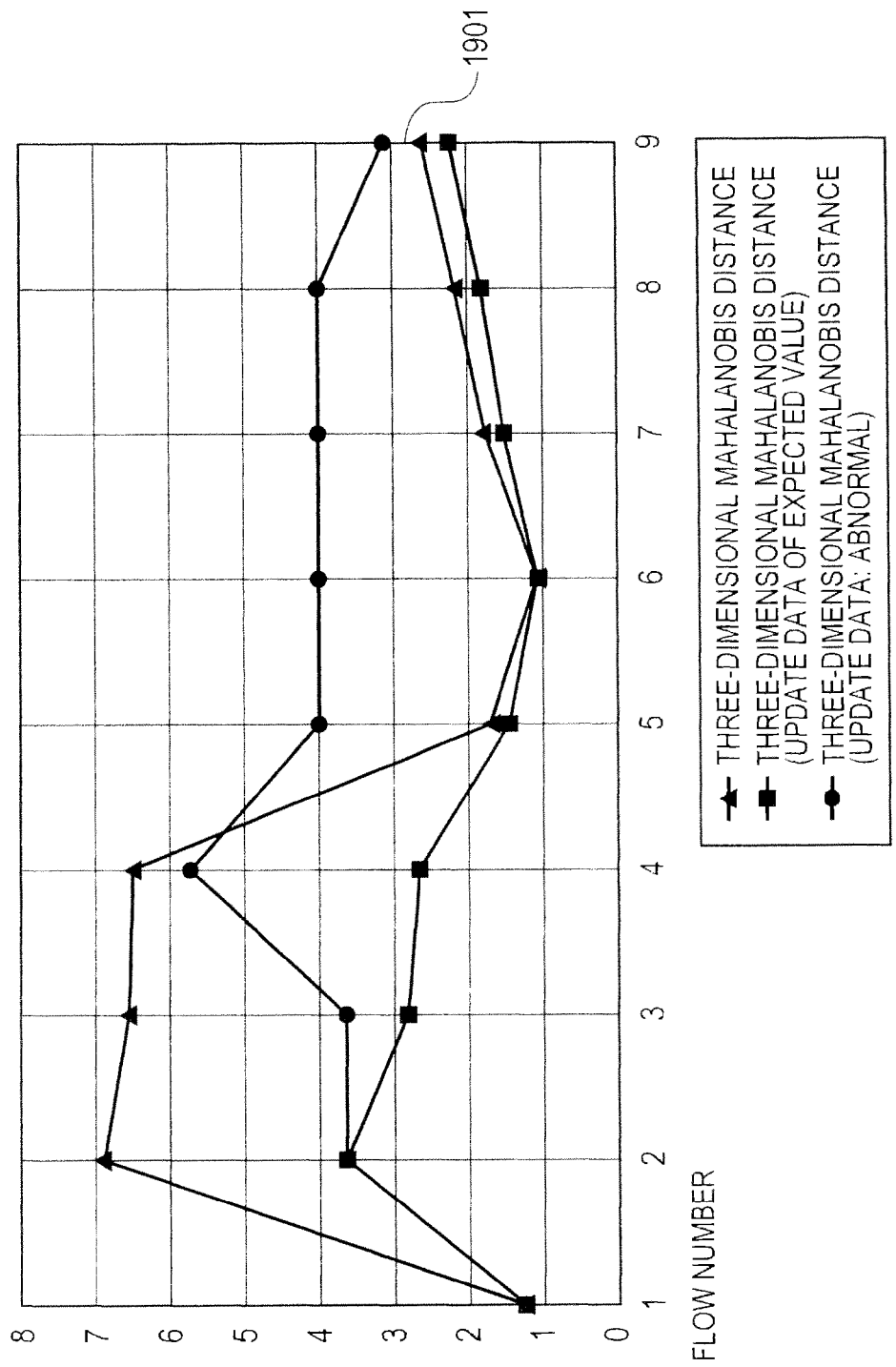
FIG. 19A is a view illustrating a graph of data of a three dimensional Mahalanobis distance in each of the embodiments.

FIGS. 19A and 19B illustrate evaluation results 1901 and 1902 of the three-dimensional Mahalanobis distance. When the expected values of the average value and the standard deviation of the reference distribution of the three-dimensional Mahalanobis distance are updated, a significantly deviated value is required as data to be determined as an abnormal distribution in which the Mahalanobis distance is deviated by 2σ from the average value of the reference distribution as compared with the Mahalanobis distance before updating. It is understood that since the expected values of the average value and the standard deviation of the reference distribution are updated, if the Mahalanobis distance calculated before updating the expected values of the average value and the standard deviation of the reference distribution is large, the value of the Mahalanobis distance is reduced in the determination. In other words, as compared with a previous result including a possibility of an erroneous detection, it is understood that the result is closer to a more normal value and feedback is performed to more appropriately perform the abnormality determination.

As described above, the data group obtained from the inspection target such as a router is a time-sequential data group which is divided into a plurality of analysis parameters and the feedback is applied to the expected values of the average value and the standard deviation of the reference distribution for every analysis parameter based on the time-sequential data group to be updated. An initial parameter for the expected values of she average value and the standard deviation of the reference distribution is set based on an experimental rule. Further, the analysis parameter is assigned to every failure, the Mahalanobis distance is calculated for the reference distribution of the plurality of three-dimensional assigned analysis parameters and the abnormality determination is comprehensively performed.

As described above, the abnormality determination is performed using the plurality of parameters and the feedback is further applied to the expected values of the average value and the standard deviation of the reference distribution based on the determination result of each of the routers while considering the causal relationship between the routers to update the expected values. Therefore, if any one of the routers detects a trouble, the other routers concurrently output abnormality detection so that it is possible to prevent the alert transmitted from the information collection failure analysis device to the management server from being excessive. Further, the number of analysis parameters is extended to a three-dimension or higher, so that it is possible to acquire an appropriate determination without erroneous detection with no limit.

Third Embodiment

Continuously, a third embodiment will be described. In the embodiment, in the above-described failure analysis device and system, when the expected values of the average value and the standard deviation of the reference distribution are updated, instead of a simple moving average, a weighted moving average is newly updated using the average value and the standard deviation of the reference distribution and the statistic information of the AFM which is transmitted from each of the routers.

The moving average of the expected values of the average and the standard deviation of the reference distribution is represented by following Equations.

$$\text{Moving average of expected value of average of reference distribution} = (\alpha^* \text{expected value of average of reference distribution} + \beta^* \text{average of data distribution acquired by AFM})/2 \quad \text{(Equation 8)}$$

$$\text{Moving average of expected value of standard deviation of reference distribution} = (\alpha^* \text{expected value of standard deviation of reference distribution} + \beta^* \text{standard deviation of data distribution acquired by AFM})/2 \quad \text{(Equation 9)}$$

$$\alpha + \beta = 1 \quad \text{(Equation 10)}$$

Using the above equations, the expected values of the average value and the standard deviation of the reference distribution are updated. When the expected values of the average value and the standard deviation of the above equations are updated, while considering the causal relationship between routers which are managed by the IMF, the expected values of the average value and the standard deviation of the reference distribution are updated only when all routers which are managed are normal. An operation of the embodiment will be described. Since the system configuration is the same as that of the above-described first and second embodiments, the description thereof will be omitted.

When the expected values of the average value and the standard deviation of the reference distribution are updated using Equations 8 to 10, a value of α, a value of β, and a ratio thereof are varied. As for α and β, $$\beta = 1/\text{Mahalanobis distance} \quad \text{(Equation 11)}$$

$$\text{If (Mahalanobis distance}<1\text{), Mahalanobis distance}=1 \quad \text{(Equation 11a)}$$

$$\alpha = 1-\beta \quad \text{(Equation 12)}$$

Using the above equations, the average value and a weighted average of the standard deviation of the reference distribution are acquired. By acquiring the weighted average as describe above, an importance is given to data which is closer to the average value and the standard deviation of the reference distribution rather than data which is much more deviated from the average value and the standard deviation of the reference distribution which are a comparison reference. As described above, the moving average is obtained corresponding to the degree of deviation so that the reference distribution which is a comparison reference is considered as a normal distribution. When the expected values of the average value and the standard deviation of the above equations are updated, while considering the causal relationship between routers which are managed by the IMF, the expected values of the average value and the standard deviation of the reference distribution are updated only when all routers which are managed are normal.

Fourth Embodiment

In the embodiment, the failure analysis device and system of the first embodiment access the network without setting initial values of the average value and the standard deviation of the reference distribution and understand the status of the network for N seconds using the AFM, and then set the data of the AFM acquired at that time as the initial values of the average and the standard deviation of the reference distribution. As described above, if the initial values of the average value and the standard deviation of the reference distribution are automatically set after studying the situation of the network, the manager does not need to set the initial values of the average value and the standard deviation of the reference distribution after estimating the situation of the system. Further, a method that, as the initial values of the reference distribution, sets the average value to 0 and a maximum acceptable value of the system, as the standard deviation is also considered. In this case, if the moving average of the reference distribution for N seconds is used, it is considered that the reference distribution may be converged into a distribution of a currently driven value from, the maximum acceptable value.

Fifth Embodiment

Continuously, a fifth embodiment will be described. In the embodiment, when the IMF performs the failure analysis in the failure analysis device and system described in the first and second embodiments performs, the following equation is defined as the analysis parameter which is used for the abnormality determination.

$$\text{Throughput of TCP/cardinality [Mbit/s]} \quad \text{(Equation 13)}$$

Here, a cardinality will be described. FIGS. 20A and 20B are views explaining the cardinality. The AFM is used as an example of a unit that acquires the analysis parameter to detect the status change from the router. In the AFM, a concept of an aggregation flow is introduced. For example, an aggregation flow which is configured by a packet in which 2-tuples match among 5-tuples (a transmission source IP address, a destination IP address, a protocol, a transmission source port number, a destination port number), as illustrated in FIGS. 20A and 208, will be described as an example. As described above, if one to n communication is considered as one aggregation flow, a new amount of statistics which is called as "cardinality" indicating how many kinds of different values appear in items which are not included in the 2-tuples may be defined. In the AFM, the cardinality is collected as a part of the statistic information. FIGS. 20A and 20B illustrate the aggregation flows in which a set of 2-tuples to match is (transmission source IP address, protocol) 2001 or (destination IP address, protocol) 2002. If the set of 2-tuples is (transmission source IP address, protocol), it is assumed that a PC is connected to a plurality of servers by a TCP communication. If the set of 2-tuples is (destination IP address, protocol), if is assumed that a server receives the TCP communication which is transmitted from a plurality of clients. The concept of the above parameter is that a cardinality is a cardinality for (transmission source IP address, protocol is TCP) or a cardinality for (destination IP address, protocol is TCP). If the cardinality is the cardinality for (transmission source IP address, protocol is TCP), the client is connected to a PC and the cardinality is an average throughput for every TCP1 communication in the connected TCP communication. If the value is large, it is assumed that a PC is connected to a plurality of servers through a large scaled TCP communication.

As described above, in the large scaled TCP communication, if the PC accesses the plurality of servers, the efficiency of the network is significantly lowered. Further, the server at the access point is likely to be down. By defining the parameter as described above, a malicious user or a user which performs the communication which may not be performed by a general user may be specified. If the cardinality is the cardinality for (destination IP address, protocol is TCP), the cardinality is an average throughput for every TCP1 communication in the TCP communication which is connected to the server. As described above, in the plural and large scaled TCP communication, if access to the server is performed, the server is likely to be down. By defining the parameter as described above, it is possible to specify a server which may be down.

An embodiment that defines a parameter represented by the following Equation in the above embodiment is considered.

$$\text{Throughput of UDP/cardinality [Mbit/s]} \quad \text{(Equation 14)}$$

Further, an embodiment that defines a parameter represented by the following Equation in the above embodiment is considered.

$$\text{Throughput of TCP/cardinality [Mbit/s]+Throughput of UDP/cardinality [Mbit/s]} \quad \text{(Equation 15)}$$

FIGS. 21A and 21B illustrate results 2101 and 2102 of Equation 13. The results illustrated in FIGS. 21A and 21B are results of the throughput for every cardinality of the Destination IPAddress when (Source IPAddress, Protocol) is fixed. Therefore, a situation where a client is connected to a plurality of servers is assumed and an average throughput of the flow which is connected to the servers is illustrated. If the value is high, it is assumed that the client is connected to a plurality of servers with a large quantity and the client may cause deterioration of the performance of the entire system. When the expected values of the average value and the standard deviation of the reference distribution with the throughput for every cardinality are updated, the Mahalanobis distance of the average for previous data is 1.592. Since a value of the Mahalanobis distance at 2σ in the distribution is 2, if the distribution follows the normal distribution, the distribution is generated at a probability of a level of a significance of 5% or higher. Therefore, it is determined that the distribution of the throughput is normal.

Further, since the Mahalanobis distance of a flow of Source IPAddress=192.168.30.6, and Source IPAddress=192.168.30.7 has a value of 2 or larger, the flow is specified as an abnormal flow. The results illustrated in FIGS. 21A and 21B are defined as one dimension in the multiple dimension analysis described above.

FIGS. 22A and 22B illustrate results 2201 and 2202 of Equation 13. The results illustrated in FIGS. 22A and 22B are results of the throughput for every cardinality of the Source IPAddress when (Destination IPAddress, Protocol) is fixed. Therefore, a situation where a server is connected to a plurality of clients is assumed and an average throughput of the flow in which the server is connected to the clients is illustrated. If the value is high, the server is assumed to be connected to a plurality of clients with a large quantity and the server may cause deterioration of the performance of the entire system. When the expected values of the average value and the standard deviation of the reference distribution of the throughput for every cardinality are updated, the Mahalanobis distance of the average for previous data is 2.81. Since a value of the Mahalanobis distance at 2σ in the distribution is 2, if the distribution follows the normal distribution, the distribution is generated at a probability of a level of significance of 5% or lower. Therefore, it is determined that the distribution of the throughput is abnormal.

Further, since the Mahalanobis distance of a flow of Source IPAddress=192.168.10.1, Source IPAddress=192.168.10.2, and Source IPAddress=192.168.10.8 has a value of 2 or larger, the flow is specified as an abnormal flow. The results illustrated in FIGS. 22A and 22B are defined as one dimension in the multiple dimension analysis described above.

The present invention as described above is not limited to the above embodiments but includes various modification embodiments. For example, the above-described embodiments have been described in detail for more understanding of the present invention but the present invention is not limited to an example that includes all configurations of the above description.

Further, a part of the configurations of any of embodiments may be substituted for the configuration of other embodiment and the configuration of one embodiment may be added to the configuration of other embodiment. In addition, other configuration may be added, deleted, or substituted with respect to a part of the configuration of each of the embodiments.

Furthermore, it is obvious that a part or ail of the configuration, the function, or the processing unit may be designed, for example, as an integrated circuit to be implemented as hardware.

REFERENCE SIGNS LIST

101 Client Pc
102 IMF
103 Integrated Management Server
104 Server Pc
105 Router
201 Integrated Management Server
202 Router
203 IMF
204 data CENTER
205 Client Pc
301 UDP Header
302 AFM Header
303 AFM Statistic Payload
304 Version Number
305 Number of Statistic Payloads
306 Reserved
307 Version Number
308 AFM Agent ID
401 Reference Distribution
402 Abnormal Distribution
501 Reference Distribution
502 Abnormal Distribution
601 Average of Standard Distribution
602 Standard Deviation of Standard Distribution
603 Abnormal Flow
701 Mahalanobis Distance of Throughput
702 Mahalanobis Distance of Average Packet Size
703 Mahalanobis Distance of Drop Ratio
801 Set Initial Value of Standard Distribution
802 Acquire Data for AFM for N Seconds
803 Determine Abnormality of All Managed Routers
804 Transmit Alert
805 Update Expected Value of Reference Distribution
901 Set Average and Standard Deviation as Reference Value of Each of Axes of Each of Routers, as Initial Value
902 Acquire Data in AFM from Each of Routers
903 Do N Seconds Elapse?
904 Verify Mahalanobis Distance of Distribution for Every Axis
905 Is Verification for M-Dimensional Mahalanobis Distance for Every Router Abnormal or Are All of Them Normal?
906 Transmit Alert to Management Server
907 Update Average and Standard Deviation Which Are Reference Values for Every Axis for Every Router
1001 NIF
1002 MPU
1003 RAM
1004 Failure Analyzing Program
1005 Alert Creating Program
1006 Storing Program
1007 Receiving Program
1008 Transmitting Program
1009 HDD
1010 DB
1101 Drop Ratio Graph
1102 Data of Drop Ratio
1201 Drop Ratio Graph
1202 Data of Drop Ratio
1301 Throughput Graph
1302 Data of Throughput
1401 Average Packet Size Graph
1402 Data of Average Packet Size
1501 Three Dimensional Mahalanobis Distance Graph
1502 Data Table of Three Dimensional Mahalanobis Distance
1601 Drop Ratio Graph
1602 Data of Drop Ratio
1701 Throughput Graph
1702 Data of Throughput
1801 Graph of Average Packet Size
1802 Data of Average Packer Size
1901 Three Dimensional Mahalanobis Distance Graph
1902 Data Table of Three Dimensional Mahalanobis Distance
2001 Cardinality When Transmission Source IP Address is Fixed 2002 Cardinality When Destination IP Address is Fixed
2101 Throughput for Every Source IPAddress as Cardinality When (Source IPAddress, Protocol) is Fixed
2102 Data of Throughput for Every Source IPAddress as Cardinality When (Source IPAddress, Protocol) is Fixed
2201 Throughput for Every Destination IPAddress as Cardinality When (Source IPAddress, Protocol) is Fixed
2202 Data of Throughput for Every Destination IPAddress as Cardinality When (Source IPAddress, Protocol) is Fixed

The invention claimed is:

1. A failure analysis device which is connected to a plurality of routers on a network, the failure analysis device comprising one or more computers,
the one or more computers comprising:
a receiving unit configured to receive information associated with every traffic flow, which is acquired by each of the routers as a data group;
a storing unit that stores the received data group; and
a failure analyzing unit configured to set the stored data group for every router as at least one analysis parameter for every failure, calculate a Mahalanobis distance with respect to a reference distribution of the analysis parameter, and perform abnormality determination using the Mahalanobis distance with respect to the reference distribution for every router,
wherein when the failure analyzing unit performs the abnormality determination using the Mahalanobis distance for the reference distribution, the failure analyzing unit is configured to update expected values of an average value and a standard deviation of the reference distribution which are used for the abnormality determination of the routers using a simple moving average or a weighted moving average, and
wherein when the failure analyzing unit updates the expected values of the average value and the standard deviation of the reference distribution which are used for the abnormality determination using the weighted moving average, a weight of the data that uses a weighted average uses a value inversely proportional to the Mahalanobis distance.

2. The failure analysis device according to claim 1, further comprising:
an alert creating unit,
wherein the alert creating unit is configured to determine a level of the alert which is transmitted to the outside based on a failure cause and a failure part specified by the abnormality determination of the failure analyzing unit.

3. The failure analysis device according to claim 1, wherein the failure analyzing unit is configured to collect the data group from the router for a predetermined time when performing the abnormality determination for every router and calculate an average value and a standard deviation of the reference distribution which are used for the abnormality determination from the collected data group to be set as an initial value of the reference distribution.

4. The failure analysis device according to claim 1, wherein the failure analyzing unit is configured to divide the plurality of analysis parameters for every failure using the acquired data group for every router and calculate the Mahalanobis distance for the reference distribution using a TCP throughput/cardinality [Mbit/s] as one of the plurality of analysis parameters.

5. The failure analysis device according to claim 1, wherein the failure analyzing unit is configured to divide the plurality of analysis parameters for every failure using the acquired data group for every router and calculate the Mahalanobis distance for the reference distribution using a UDP throughput/cardinality [Mbit/s] as one of the plurality of analysis parameters.

6. The failure analysis device according to claim 1, wherein the failure analyzing unit is configured to divide the plurality of analysis parameters for every failure using the acquired data group for every router and calculate the Mahalanobis distance for the reference distribution using (TCP throughput+UDP throughput)/cardinality [Mbit/s] as one of the plurality of analysis parameters.

7. A network failure analysis system, comprising:
a plurality of routers whose nodes are connected on the network; and
a failure analysis device which is connected to the plurality of routers,
wherein the failure analysis device includes one or more computers,
the one or more computers comprising:
a receiving unit configured to receive information associated with every traffic flow, which is acquired by each of the routers as a data group, and
a failure analyzing unit configured to set the received data group for every router as at least one analysis parameter for every failure, calculate a Mahalanobis distance with respect to a reference distribution of the analysis parameter, and perform abnormality determination using the Mahalanobis distance with respect to the reference distribution for every router,
wherein when the failure analyzing unit performs the abnormality determination using the Mahalanobis distance for the reference distribution, the failure analyzing unit is configured to update expected values of an average value and a standard deviation of the reference distribution which is used for the abnormality determination of the router using a simple moving average or a weighted moving average, and
wherein when the failure analyzing unit updates the expected values of the average value and the standard deviation of the reference distribution which are used for the abnormality determination using the weighted moving average, a weight of the data that uses a weighted average uses a value inversely proportional to the Mahalanobis distance.

8. The failure analysis system according to claim 7, wherein the node that includes the failure analyzing unit further includes an alert creating unit, and the alert creating unit being configured to determine a level of the alert which is transmitted based on a failure cause and a failure part specified by the abnormality determination of the failure analyzing unit.

9. The failure analysis system according to claim 8, further comprising:
a management server which is connected to the node including the failure analyzing unit on the network,
wherein the node including the alert creating unit further includes:
a transmitting unit configured to transmit an alert whose level is determined by the alert creating unit to the management server.

10. A failure analysis method in a node comprising one or more computers, which is connected to a plurality of routers in a network, the method comprising the node to perform the steps of:
receiving information associated with every traffic flow, which is acquired by each of the routers as a data group; and setting the received data group for every router as at least one analysis parameter for every failure, calculating a Mahalanobis distance with respect to a reference distribution of the analysis parameter, and performing abnormality determination using the Mahalanobis distance with respect to the reference distribution for every router, wherein when the node performs the abnormality determination using the Mahalanobis distance for the reference distribution, the node updates expected values of an average value and a standard deviation of the reference distribution which is used for the abnormality determination of the router using a simple moving average or a weighted moving average, and wherein when the node updates the expected values of the average value and the standard deviation of the reference distribution which are used for the abnormality determination of the router using the weighted moving average, a weight of the data that uses a weighted average uses a value inversely proportional to the Mahalanobis distance.

\* \* \* \* \*